(12) United States Patent
Todasco

(10) Patent No.: US 10,979,869 B2
(45) Date of Patent: Apr. 13, 2021

(54) CLIENT DEVICE ACCESS TO DATA BASED ON ADDRESS CONFIGURATIONS

(71) Applicant: PayPal, Inc., San Jose, CA (US)

(72) Inventor: Michael Charles Todasco, Santa Clara, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 16/878,422

(22) Filed: May 19, 2020

(65) Prior Publication Data

US 2020/0413232 A1    Dec. 31, 2020

Related U.S. Application Data

(63) Continuation of application No. 16/298,736, filed on Mar. 11, 2019, now Pat. No. 10,659,932, which is a continuation of application No. 15/682,370, filed on Aug. 21, 2017, now Pat. No. 10,231,098, which is a continuation of application No. 14/871,915, filed on Sep. 30, 2015, now Pat. No. 9,743,261.

(51) Int. Cl.

| | |
|---|---|
| *H04W 4/18* | (2009.01) |
| *H04L 29/06* | (2006.01) |
| *H04L 29/12* | (2006.01) |
| *H04L 12/26* | (2006.01) |
| *H04W 4/02* | (2018.01) |
| *H04W 12/08* | (2021.01) |
| *H04L 29/08* | (2006.01) |

(52) U.S. Cl.
CPC ............. *H04W 4/18* (2013.01); *H04L 43/106* (2013.01); *H04L 61/2053* (2013.01); *H04L 63/0853* (2013.01); *H04L 63/102* (2013.01); *H04L 67/02* (2013.01); *H04W 4/025* (2013.01); *H04W 12/08* (2013.01); *H04L 2463/121* (2013.01)

(58) Field of Classification Search
CPC ....... H04W 4/18; H04W 4/025; H04W 12/08; H04L 43/106; H04L 61/2053; H04L 63/0853; H04L 63/102; H04L 67/02; H04L 2463/121
USPC ........... 455/438, 414.3, 414.4, 412, 418–420
See application file for complete search history.

(56) References Cited

U.S. PATENT DOCUMENTS

| | | |
|---|---|---|
| 8,905,303 B1 | 12/2014 | Ben Ayed |
| 8,972,525 B1 | 3/2015 | Ramachandran et al. |
| 9,965,763 B1 | 5/2018 | Gupta et al. |

(Continued)

*Primary Examiner* — Congvan Tran
(74) *Attorney, Agent, or Firm* — Haynes and Boone, LLP

(57) ABSTRACT

Various systems, mediums, and methods herein describe mechanisms that enable client devices to have access to data based on various address configurations. A smart phone system may be configured to receive a request. The smart phone system may also be configured to determine an address based at least on the request received, where the address provides access to data on a website. The smart phone system may also determine the address based on a receipt of the address generated by a server system. The smart phone system may also determine a timestamp associated with a transfer of the address at a geolocation. The smart phone system may also determine one or more time periods from the timestamp associated with the transfer of the address at the geolocation. The address may provide access to the data on the website during the one or more time periods.

20 Claims, 10 Drawing Sheets

(56) References Cited

U.S. PATENT DOCUMENTS

| | | |
|---|---|---|
| 2004/0005051 A1* | 1/2004 | Wheeler .............. H04L 9/3247 |
| | | 380/28 |
| 2008/0041942 A1* | 2/2008 | Aissa ................... G06Q 20/341 |
| | | 235/382 |
| 2009/0081989 A1 | 3/2009 | Wuhrer |
| 2011/0173075 A1 | 7/2011 | Carlson et al. |
| 2011/0191366 A1 | 8/2011 | Eustace et al. |
| 2013/0060708 A1 | 3/2013 | Oskolkov et al. |
| 2014/0136401 A1 | 5/2014 | Smythe |
| 2014/0207553 A1 | 7/2014 | Morse et al. |
| 2014/0229189 A1* | 8/2014 | Dean ..................... G06Q 40/08 |
| | | 705/2 |
| 2014/0289028 A1 | 9/2014 | Bosworth et al. |
| 2015/0120549 A1 | 4/2015 | Khalid et al. |
| 2015/0121464 A1 | 4/2015 | Hughes, Jr. et al. |
| 2015/0195288 A1* | 7/2015 | Hoyos .................... G06F 21/32 |
| | | 726/4 |
| 2015/0304819 A1 | 10/2015 | Busch |
| 2015/0334533 A1 | 11/2015 | Luo et al. |
| 2016/0012427 A1 | 1/2016 | Van Heerden et al. |
| 2016/0012445 A1* | 1/2016 | Villa-Real ............ G06Q 20/353 |
| | | 705/44 |
| 2016/0180325 A1 | 6/2016 | Davis et al. |
| 2017/0017501 A1 | 1/2017 | Quast |
| 2017/0032351 A1 | 2/2017 | Burroughs et al. |
| 2020/0137050 A1* | 4/2020 | Reddimasi .......... H04L 63/0861 |

* cited by examiner

US 10,979,869 B2

CLIENT DEVICE ACCESS TO DATA BASED ON ADDRESS CONFIGURATIONS

CROSS REFERENCE TO RELATED APPLICATIONS

This application is a continuation of U.S. patent application Ser. No. 16/298,736, filed on Mar. 11, 2019, which is a continuation of U.S. patent application Ser. No. 15/682,370, filed on Aug. 21, 2017, now U.S. Pat. No. 10,231,098, issued on Mar. 12, 2019, which is a continuation of U.S. patent application Ser. No. 14/871,915, filed on Sep. 30, 2015, now issued U.S. Pat. No. 9,743,261, issued on Aug. 22, 2017, which are hereby incorporated by reference in their entirety.

TECHNICAL FIELD

This disclosure generally relates to electronic communications systems, and more particularly, systems configured to transfer data in one or more networks.

BACKGROUND

Transferring data has become one of the more essential tasks performed by mobile devices. Mobile phones generally rely on a broad range of technology to ensure the transfer of data, including technology within the mobile phones and also the technology of the data infrastructure. For example, consider a scenario where a user wishes to electronically transfer funds from the user's account to a friend's account using a smart phone. In this scenario, consider how quickly the user may become frustrated if it takes more than a few seconds to transfer the funds. In some instances, users may be unsatisfied if the wait time exceeds a mere five seconds to complete the data transfer process.

However, during such a short period of time, various processes may be taking place in the backend, possibly unbeknownst to many users of mobile devices. Example processes may include authenticating the user's request to make the transfer to the friend, identifying the user's account from potentially numerous other accounts, validating or checking to ensure the user has adequate funds in an account to successfully make the transfer, and/or ensuring the friend may securely receive the funds in a respective account, among other possible validations and additional processes. As demonstrated in the scenario above, consumer demands to instantaneously complete data transfers securely and reliably continue to increase, particularly with the growing number of mobile devices in the modern world.

As demonstrated above, there is much need for technological advancements in various aspects of mobile technology and the data infrastructure to ensure that mobile devices are able to instantaneously transfer data securely and reliably.

Figure 1:
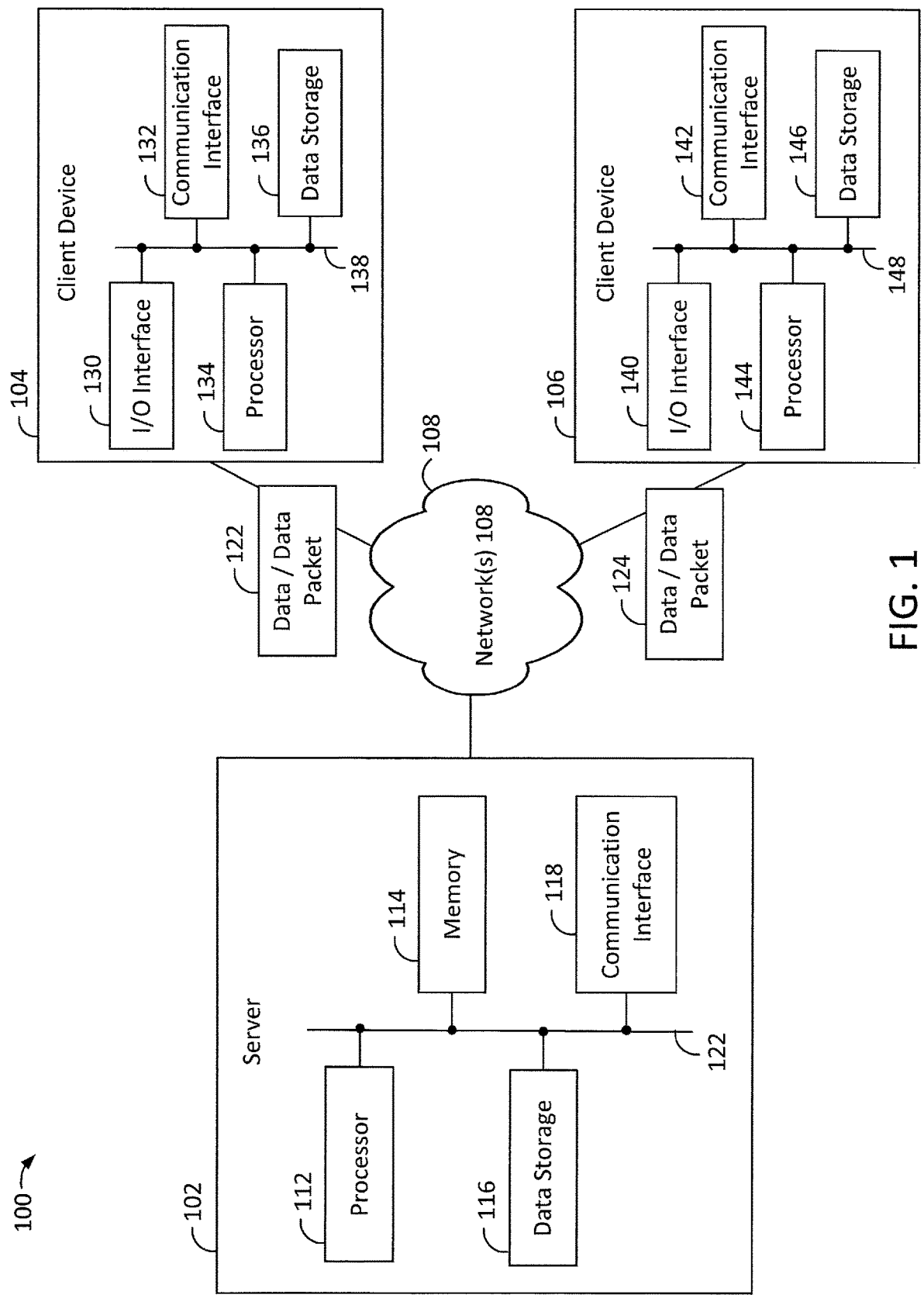
FIG. 1 is a block diagram of an exemplary system, according to an embodiment.

Embodiments of the present disclosure and their advantages may be understood by referring to the detailed description that follows. It should be appreciated that reference numerals are used to identify elements illustrated in the figures. Further, the figures may illustrate various examples for purposes of illustration and explanation related to the embodiments of the present disclosure and not for purposes of limitation.

DETAILED DESCRIPTION

Various data transfer mechanisms may be implemented to electronically transfer data. In particular, example data transfer mechanisms may involve using email, short message service (SMS), instant messaging (IM), online data transfers, and/or file transfer protocols, among a number of other possibilities. However, such mechanisms may also have a number of drawbacks. For example, using email and messaging (e.g., SMS and/or IM) to transfer data typically involves a sender disclosing her email address and/or phone number to complete the data transfer. Yet, in some instances, the sender may wish to send data without disclosing her email address and/or phone number.

As such, some data transfer mechanisms may involve the use of an address to a website, possibly to transfer data that may be made available on the website. In particular, the address may indicate a location in the network and/or a terminal in the data infrastructure such that a computer device with the address may access the website to retrieve the data to complete the data transfer. Thus, various addresses may be used to transfer data from one device to another device. However, some challenges may arise with using an address to transfer data. For example, many users may prefer other mechanisms described above (e.g., email or messaging) to transfer data because they may be less familiar with addresses, such as uniform resource locators (URLs). In particular, users may be less familiar with what URLs are and/or how they are created or maintained, among various other reasons. Further, a URL, for example, may be accessed by other devices where these other devices may access the data on the website, thereby possibly exposing the data to multiple devices and perhaps compromising the security of the data.

Example embodiments herein describe various aspects of data transfer mechanisms that utilize addresses to locations in one or more of the networks and/or the data infrastructure. For example, a sender may transfer data to a recipient by providing the recipient with an address to a website, possibly located in one or more networks and/or the data infrastructure. Yet, the transfer of the address to the recipient may be associated with a particular timestamp and a geolocation such that the data on the website may be secured for the recipient, possibly for a given amount of time from the timestamp. In particular, the given amount of time from the timestamp may be shared with the recipient, possibly unbeknownst to other users of the network. In some instances, the data on the website may include data that initiates a fund transfer to the recipient, perhaps where the data may be used to initiate an electronic transfer of the funds from the sender's account to the recipient's account.

In practice, consider a scenario where a traveler may be picked up by a driver of a bus, e.g., a limousine bus. The driver may pick up the traveler's luggage to store the luggage on the bus. The traveler may be out of cash, but may still wish to tip the driver with some funds. As such, the traveler may wish to electronically send funds to the driver, possibly without having to send the driver an electronic message, e.g., an email and/or a text message. In particular, the traveler may wish to avoid sending her email address and/or phone number to the driver, possibly for privacy reasons. In particular, further consider that the driver is accompanied by multiple other bellboy helpers (e.g., hotel porters and/or bellboys). In such scenarios, the traveler may wish to avoid sending her email address and/or phone number to a group of such individuals. Yet further, the traveler may wish to avoid sending the funds through a service provider or a payment provider that may also reveal information regarding the traveler. Thus, the traveler may create a request through her smart phone to create an address to a website that facilitates the electronic transfer of funds. As such, the driver and/or a group of individuals working with the driver may use the address to retrieve data available on the website to imitate the data transfer and receive the funds. Thus, the website may include web pages, documents, plain text, media, resources from other websites with suitable markup anchors, and/or other forms of data, possibly to initiate the data transfer to of the funds.

As noted, the address may be transferred to the driver at a particular geolocation and time. For example, the traveler's smart phone may create an address, "www.paypal.com/traveler-tip-$5," possibly indicating the amount of the funds transferrable in the address. In some instances, the address may be "www.papal.com/traveler-tip-$5-hotel-pickup-at-10am" to indicate a particular geolocation of the smart phone (e.g., in front of a hotel) and the corresponding time of the transfer (e.g., at 10:00 AM). Thus, the address may reflect details and/or identifications of a real world geographic locations and times. The address may also include a set of geographic coordinates (e.g., longitude and latitude), an object (e.g., a monument, a street address, and/or a cross-section), a radar source, and/or a mobile phone and/or Internet-connected computer terminal, among other possibilities.

In some instances, the traveler may write the address down on a piece of paper and hand it to the driver to complete the transfer at a particular geolocation. In some instances, the address may be electronically transmitted to the driver's smart phone, perhaps with a radio connection established by the traveler's smart phone making contact with the driver's smart phone at the geolocation. Further, in some instances, the driver's smart phone may have to stay within a given radius from the geolocation to use the address and retrieve data from the website. In some instances, the driver may have a period of time, e.g., a forty-eight hour window in time, from when the address is created or transferred to the driver, to use the address to retrieve the data from the website. As such, the address may be a "one-time" address that may expire based on a retrieval of the data from the website to receive the funds.

In some embodiments, various validations may be implemented when the address is used to access the data from the website. In particular, considering one or more of the scenarios above, the driver may use her smart phone to open a browser, enter the address provided by the traveler, and attempt to access data on the corresponding website possibly to retrieve the funds. As such, the driver's smart phone may request a connection with a server maintaining the data on the website. The server may request data from the driver's smart phone based on multiple server-client connection protocols before enabling the driver's smart phone to download the data on the website.

For example, the server may request data that identifies the driver's smart phone location, possibly before enabling the driver's smart phone to access the data on the website. In some instances, the server may determine whether the driver's smart phone is within a given radius from the geolocation where the address was created and/or the geolocation where the address was transferred to the driver. In particular, the server may permit the driver's smart phone to access the website if the location of the driver's smart phone is within the given radius from a geolocation. In some instances, the server may determine that the driver's smart phone is outside of the given radius and the smartphone's request to connect with the server may be declined. Thus, in some instances, the smartphone may not be able to retrieve the data available on the website.

In some embodiments, the server may determine the traveler and the driver were together at a particular point in time, possibly based on location data retrieved from both of their smartphones. In some instances, the server may determine that the traveler and the driver were together at a particular point in time and/or a time period in which the traveler was driven to the airport. Thus, based on determining the times and/or time periods in which the traveler and the driver were together, the server may allow or permit the driver's smart phone to access the website with the address.

In some instances, consider another scenario where the server determines an external device (e.g., some device other than the driver's smartphone and the traveler's smartphone) that attempts to access the website with the address. In particular, the server may determine that the traveler's smart phone and the external device were not together at any particular point in time, possibly based on location data retrieved from both devices. In such instances, a request from the external device to access the website may be declined and the server may generate a notification and transmit the notification to the traveler's smart phone and/or the driver's smart phone to alert the traveler and/or the driver that an external device is attempting to access the website.

In some embodiments, various authentication mechanisms may be implemented based on the external device that attempts to access the data on the website using the address. In some instances, the server may change the first address created to a second address that may be used to access the website. Further, the first address may be expired such that it may no longer be used to access the website. For example, the first address, "www.paypal.com/traveler-tip-$5," may be changed to the second address, "www.paypal.com/$5-traveler-to-driver," possibly to include an indication of the intended recipient (e.g., the driver). As noted, the traveler's and/or the driver's smart phone may receive a notification that indicates the external device is attempting to access the website. Further, the notification may include the second address such that the driver's smart phone may use the second address to access the data on the website, thereby preventing the external device from accessing the data on the website.

In some embodiments, the server may allow the driver's smart phone to access the website based on a pre-determined period of time afforded to the driver to retrieve the data from the website with the address provided by the traveler. For example, the driver may have a forty-eight hour window in time from when the address is created before the website expires, e.g., the server takes down the website, the server takes the website offline, and/or the server generates a new address that provides access to the website where the old address does not provide access to the website. In some instances, the server may set the period of time according to the driver's schedule and/or a calendar retrieved from the driver's smart phone during the server-client connection protocols. In particular, the server may initiate a forty-eight hour window from when the driver is on lunch break according to the driver's work schedule. The server may also initiate the window in time from when the driver completes her work for the day according to her work schedule, among other possibilities.

In some embodiments, a smart card may be configured to provide the address to a recipient. For example, referring to the one or more scenarios above, the smart card may be used to transfer the address from the traveler to the driver. In particular, the traveler may configure a smart card to display the address that provides access to the website. In some instances, the smart card may communicate with the server such that the smart card may receive and possibly display the address on a graphical user interface of the smart card. As such, the traveler may configure and/or activate the card to display the address and hand the smart card to the driver as the traveler is getting off the bus, possibly in lieu of cash for the tip. Further, the smart card may include a near field communication chip and/or a global positions system (GPS) chip that detects a geolocation where the smart card is transferred to the driver and the corresponding time of the transfer (e.g., the timestamp of the transfer).

As such, the server may enable the driver's smart phone to access the website by using the address displayed on the smart card. Further, the driver's smart phone may have access to the website based on the location of the smart phone within a threshold distance from the location where the smart card was transferred to the driver. Yet further, the driver's smart phone may have access to the website based on the time the driver attempts to access the website being within a given period of time from when the smart card was transferred to the driver. In some instances, the driver may transfer (e.g., hand or exchange) the smart card to another individual, possibly a second traveler who may be out of cash. Thus, the second traveler may reconfigure the smart card to create a second address that provides access to data on a second website. As such, the driver may use the second address to access the data on the second website and receive an electronic transfer of funds from the second traveler. In particular, the smart card may be reconfigured multiple times to generate data on additional websites to transfer funds in various other instances.

In various respects, the example embodiments described herein may resolve challenges to transferring data over the computer networks and/or data stored in various locations of the data infrastructure. As such, various embodiments described herein may solve problems that did not exist before the availability of computer networks, the data infrastructure, and/or the Internet. In particular, various such embodiments may solve problems specific to computer networks, the data infrastructure, the Internet, and/or the interoperability of these technological areas, among other possible areas. In addition, various such embodiments may include solutions that are technical nature and/or rooted in data transfer mechanisms and data infrastructure technology.

In some embodiments, a server system may operate as part of the network and/or the data infrastructure. The server system may be configured to perform operations in relation to a service or payment provider, such as PayPal, Inc. of San Jose, Calif., USA. In some embodiments, the server system may be configured to generate an address based on a request received from a client device, such as the traveler's smart phone described above, for example. As such, the address may be configured to provide access to data on a website, possibly maintained and/or secured by the server system. Further, the data on the website accessed by the client device may initiate an electronic transfer of funds to an account associated with the client device. As such, the server may determine a timestamp associated with the transfer of the address at a given geolocation. Further, the server may determine one or more time periods from the timestamp such that the client device may access the data on the website during the one or more time periods.

FIG. 1 is a block diagram of an exemplary system 100, according to an embodiment. The system 100 may be configured to transfer data over one or more networks 108 of the data infrastructure and/or system 100. In particular, the server 102, the client device 104, and/or the client device 106 may each be configured to communicate over the communication network 108. As shown, the system 100 includes multiple computing devices, such as a server 102, a client device 104, and a client device 106, among other possible computing devices. The server 102 may be configured to create and maintain the security of multiple websites, possibly accessible by the client devices 104 and/or 106. The system 100 may operate with more or less than the computing devices shown in FIG. 1, where each device may be configured to communicate over one or more communication networks 108, possibly to transfer data accordingly. In some instances, the one or more communication networks 108 may include a data network and a cellular network.

The server 102 may be configured to perform various operations in relation to the system 100. In some embodiments, the server 102 may be configured to generate an address based on a request received from a client device, such as the client device 104, for example. The address may be configured to provide access to data on a website that may be created and/or maintained by the server 102. The server 102 may also be configured to transmit the address, possibly encoded with the data/data packet 122, to the client device 104. In particular, the address may be encoded with an encryption key length of 128 bits or greater and transferred at a geolocation. As such, the address may be transferred from a user of the client device 104 to a user of the client device 106 at the geolocation.

In some instances, the address may be transferred based on a physical distance detected between the client device 104 and client device 106 or possibly physical contact made between the client device 104 and client device 106. For example, the client device 104 may include a number of loop antennae that detects the physical distance and/or the physical contact. Thus, the client device 104 may transfer the address, possibly encoded in the data/data packet 124, to the client device 106 based on the physical distance and/or the physical contact. As such, the server 102 may determine a timestamp associated with the transfer of the address at the geolocation, possibly also based on the physical distance and/or the physical contact. Further, the server may determine one or more time periods from the timestamp associated with the transfer of the address at the geolocation. Thus, the address provides the client device 106 with access to the data during the one or more time periods.

The data/data packets 122 and/or 124, may be transferrable via communication languages and/or protocols such as Transmission Control Protocol/Internet Protocol (TCP/IP).

In various embodiments, each of the data/data packets 122 and 124 may be assembled or disassembled into larger or smaller packets of varying sizes, such as 1,000 to 1,500 bytes, for example, among other possible data ranges. As such, data/data packets 122 and/or 124 may be transferrable over the network 108, among various other locations in the data infrastructure in the system 100.

In some embodiments, the server 102 may take a variety of forms. The server 102 may be an enterprise server, possibly operable with one or more operating systems to facilitate the scalability of the data infrastructure of the system 100. For example, the server 102 may operate with a Unix-based operating system configured to integrate with a growing number of other servers, client devices, and/or networks over variable architectures, and further facilitate the increased workloads associated with numerous data transfers and increased resources.

In some embodiments, the server 102 may include multiple components, such as one or more processors 112, one or more memories 114, one or more data storages 116, and/or one or more communication interfaces 118, among other possible components, any of which may be communicatively linked via a system bus, network, or other connection mechanism 122. The processor 112 may take the form of a multi-purpose processor, a microprocessor, a special purpose processor, a digital signal processor (DSP) and/or other types of processing components. For example, processor 112 may include a variable-bit (e.g., 64-bit) scalable processor architecture configured to execute varying instructions sets (e.g., simplified and complex instructions sets) with fewer cycles per instruction than other conventional general-purpose processors to improve performance of the server 102.

In some embodiments, the processor 112 may be configured to generate an address based on a request received from one or more of the client devices 104 and/or 106 and configure a website accessible with the address. The processor 112 may also be configured to transmit the address to one or more of the client devices 104 and/or 106. Further, the processor 112 may also be configured to determine a timestamp associated with a transfer of the address at a geolocation. The processor 112 may also determine one or more time periods from the timestamp associated with the transfer of the address at the geolocation, where the address may provide access to the data on the website during the one or more time periods.

The memory component 120 and/or the data storage 116 may include one or more volatile, non-volatile, and/or replaceable storage components, such as magnetic, optical, and/or flash storage that may be integrated in whole or in part with the processor 112. Further, the memory component 120 may include or take the form of a non-transitory computer-readable storage medium, having stored thereon computer-readable instructions that, when executed by the processing component 112, cause the server 102 to perform machine learning operations, such as those described in this disclosure and illustrated by the accompanying figures.

The communication interface or component 118 may take a variety of forms and may be configured to allow the server 102 to communicate with one or more devices, such as client devices 104 and/or 106, according to a number of protocols. For example, the communication interface 118 may include a transceiver that enables the server 102 to communicate with the client devices 104 and/or 106 via the one or more communication networks 108. Further, the communication interface 118 may include a wired interface, such as an Ethernet interface, and/or a wireless interface, such as a cellular and/or microcell interface, a WI-FI interface. The wireless interface may also include interfaces operable to transfer data over short distances utilizing short-wavelength radio waves in approximately the 2.4 to 2.485 GHz range. In some instances, the communication interface 118 may send/receive data or data packets to/from client devices 104 and/or 106.

The client devices 104 and 106 may also be configured to perform a variety of operations such as those described in this disclosure and illustrated by the accompanying figures. In particular, client devices 104 and 106 may be configured to transfer data/data packets 122 and/or 124 with the server 102, that include addresses, dynamic addresses, uniform and/or dynamic resource locators, location data, GPS data, beacon data, WI-FI data, base station data, triangulation data, peer data, social media data, sensor data, movement data, temperature data, and/or other types of data described above.

In some embodiments, the client devices 104 and 106 may include or take the form of a smart phone system, a personal computer (PC) (e.g., a laptop device), a wearable computer device, a head-mountable display device, tablet computer device, a merchant device, a smart watch device, other types of wearable devices, and/or other types of computing devices configured to transfer data, among other possibilities. The client devices 104 and 106 may include various components, including, for example, input/output (I/O) interfaces 130 and 140, communication interfaces 132 and 142, processors 134 and 144, and data storages 136 and 146, respectively, all of which may be communicatively linked with each other via a system bus, network, or other connection mechanisms 138 and 148, respectively.

The I/O interfaces 130 and 140 may be configured to receive inputs from and provide outputs to one or more users of the client devices 104 and 106. For example, the I/O interface 130 may include a graphical user interface configured to receive an input that indicates a request to create an address to a website. Thus, the I/O interfaces 130 and 140 may include input hardware with tangible surfaces such as touchscreens with touch sensitive sensors and/or proximity sensors, a microphone configured to receive voice commands, a computer mouse, a keyboard, and/or other input mechanics from the real world environment. In addition, I/O interfaces 130 and 140 may include output hardware such as touchscreen displays, a sound speaker, other audio output mechanism, a haptic feedback system, and/or other output hardware.

In some embodiments, the client device 104 may determine an address based on the request received from the graphical user interface 130. In some instances, the client device 104 may generate the address based on the request received. For example, the user may request the address to be "www.paypal.com/user-tip-$10-1052AM." Further, in some instance, the client device 104 may request the server 102 to generate the address. For example, the client device 104 may request the server 102 to generate an address based on text submitted or entered in the request. For instance, the text in the user's request may include a description, "user's tip for $10 at 10:52 AM," and the server 102 may generate the address based on the description. In some instances, the server 102 may create the address based on the closest available address to the address requested, "www.paypal.com/user-tip-$10-1052AM," as described above.

In some embodiments, communication interfaces 132 and 142 may include or take a variety of forms. For example, communication interfaces 132 and 142 may be configured to allow client devices 104 and 106, respectively, to communicate with one or more devices according to a number of protocols. For instance, communication interfaces 132 and 142 may be configured to allow client devices 104 and 106, respectively, to communicate with the server 102 via the communication network 108. The processors 134 and 144 may include a multi-purpose processor, a microprocessor, a special purpose processor, a digital signal processor (DSP), an application specific integrated circuit (ASIC), a programmable system-on-chip (SOC), field-programmable gate array (FPGA), and/or other types of processing components.

The data storages 136 and 146 may include one or more volatile, non-volatile, removable, and/or non-removable storage components, and may be integrated in whole or in part with processors 134 and 144, respectively. Further, data storages 136 and 146 may include or take the form of non-transitory computer-readable mediums, having stored thereon instructions that, when executed by processors 134 and 144, cause the client devices 104 and 106 to perform operations, respectively, such as those described in this disclosure and illustrated by the accompanying figures.

In some embodiments, the communication network 108 may be used to transfer data between the server 102, the client device 104, the client device 106, and/or other computing devices associated with the data infrastructure. The communication network 108 may be a packet-switched network configured to provide digital networking communications and/or exchange data of various forms, content, type, and/or structure. The communication network 108 may include a data network such as a private network, a local area network, and/or wide area networks. Further, the communication network 108 may include a cellular network with one or more base station and/or cellular networks of various sizes.

In some embodiments, the client device 104 may create a request possibly encoded with data/data packet 122 to establish a connection with the server 102. As such, the request may initiate a search of an internet protocol (IP) address of the server 102, that may, for example, take the form of the IP address, "192.168.1.102," for example. In some instances, an intermediate server, e.g., a domain name server (DNS) and/or a web server, possibly in the one or more networks 108 may identify the IP address of the server 102 to establish the connection between the client device 104 and the server 102. As such, the client device 104 may request the server 102 to generate a website and an address that may be used to access the website.

As noted, the address generated may be transferred with the data/data packet 124 to a second device, e.g., the client device 106, such that the client device 106 may attempt to access the data on the website. In particular, the client device 106 may request to establish a connection with the server 102. The request may initiate a search with one or more of the intermediate server described above to identify the IP address of the server 102. Based on identifying the IP address of the server 102, the client device 106 may request to establish the connection with the server 102. In some instances, the server 102 may request various forms of data such as the location data of the client device 106. Based on receiving the location data (e.g., GPS coordinates of the client device 106), for example, the server 102 may allow the client device 106 to access the website and/or based on the data on the website, possibly initiate a transfer of funds to an account associated with the client device 106. In some instances, the communication network 108 may include web servers, network adapters, switches, routers, network nodes, base stations, microcells, and/or various buffers/queues to exchange data/data packets 122 and/or 124.

In some embodiments, the server 102 may include a non-transitory computer-readable medium, possibly integrated with the memory 114. The non-transitory computer-readable medium may include instructions that, when executed by one or more of the processors 112, cause the server 102 to perform operations such as generating an address based on a request in the data/data packet 122 received by the client device 104. The address may be configured to provide access to data on a website. The server 102 may transmit the address to the client device 104. The server 102 may also determine a timestamp associated with a transfer of the address at a geolocation. For example, the server 102 may determine the timestamp of the transfer from the client device 104 to the client device 106 at a particular geolocation proximate to locations of the client device 104 to the client device 106. The server 102 may also determine one or more time periods from the timestamp associated with the transfer of the address at the geolocation, where the address may provide the client device 106 with access to the data during the one or more time periods.

It can be appreciated that the server 102 and the client devices 104 and 106 illustrated in FIG. 1 may be deployed in other ways. The operations performed and/or the services provided by such client devices 104 and 106 may be combined or separated for a given embodiment and may be performed by a greater number or fewer number of devices. Further, one or more devices may be operated and/or maintained by the same or different entities.

In some embodiments, an account, possibly also referred to a user account, may be a compilation of data associated with a given user. Some examples of accounts may include accounts with service or payment providers such as PayPal, Inc. of San Jose, Calif., USA and/or other types of financial, transactional, and/or e-commerce related accounts. Further, accounts may also include social networking accounts, e-mail accounts, smart phone accounts, music playlist accounts, video streaming accounts, among other possibilities. For example, an account for a particular user may include data related to the user, data related to the user's interest, and/or data representing the user. Further, the user may provide various types of data to the account via a user device, e.g., client devices 104 and/or 106.

The user account may be displayed on a client device, possibly through I/O interfaces 130 and/or 140 described above in relation to FIG. 1. Thus, the user account may be displayed on a smart phone system and/or any of the devices described herein to access the account. For example, the user may manage one or more of their accounts on client devices 104 and/or 106. In particular, the client device 104 may be used to generate, view, and/or send one or more requests to transfer funds from one account to another account, such as an account accessible by the client device 106.

In some embodiments, a user may have a single account such as an account with a service or payment provider representing the user for multiple other accounts described above. For example, the single user account may represent the user for other e-mail accounts, social networking accounts, smart phone accounts, as well as websites, applications, and/or other services. For example, a user could opt to use their account as a multi-purpose account for performing various operations, including generating addresses that provide access to data on websites.

In some embodiments, a user account may be created by one or more users. For example, one account may be a family account where a number of family members or users may have access to the family account. In some instances, the account may be a corporate account, where employees, staff, worker personnel, and/or contractors, among other individuals may have access to the corporate account. Yet further, it should be noted that a user, as described herein, may be a robot, a robotic system, a computing device, a computing system, and/or another form of technology capable of transferring data and/or funds corresponding to the account. A user may be required to provide a login, a password, a code, an encryption key, authentication data, biometric data, and/or other types of data to access to the account.

Figure 2A:
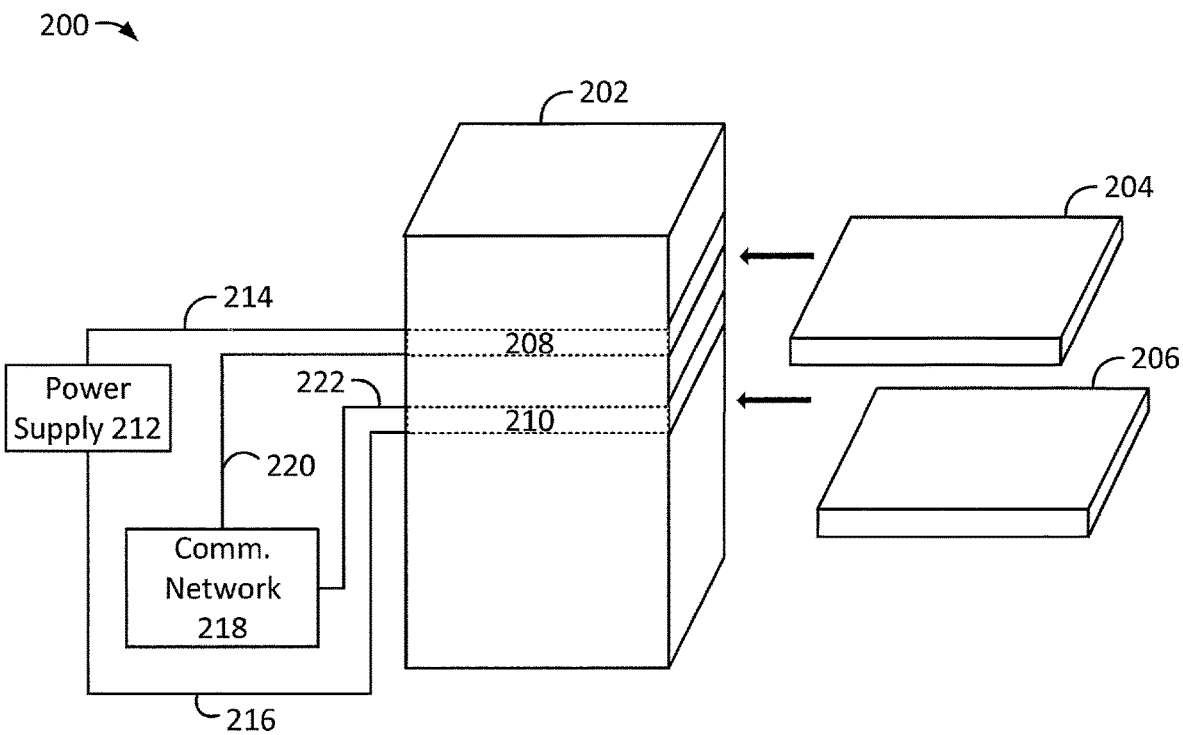
FIG. 2A illustrates an exemplary system configured to support a set of trays, according to an embodiment.

FIG. 2A illustrates exemplary system 200 configured to support a set of trays, according to an embodiment. The system 200 may, for example, include the server 102 described above in relation to FIG. 1. Further, the system 200 may generate addresses to various websites. The system 200 may further support, operate, run, and/or manage the websites in relation to various transfers of funds between accounts.

As shown, system 200 may include a chassis 202 that may support trays 204 and 206 (possibly also referred to as servers) and multiple other trays as well. The chassis 202 may include slots 208 and 210, among other possible slots, configured to hold or support trays 204 and 206, respectively. For example, the tray 204 may be inserted into the slot 208 and the tray 206 may be inserted into the slot 210. Yet, the slots 208 and 210 may be configured to hold the trays 204 and 206 interchangeably such that the slot 208 may be configured to hold the tray 206 and the slot 210 may be configured to hold the tray 204. For example, during operation of the system 200, the tray 204 may be inserted into the slot 208 and the tray 206 may be inserted into the slot 210. Further, the trays 204 and 206 may be removed from the slots 208 and 210, respectively. Yet further, the tray 204 may be inserted into the slot 210 and the tray 206 may be inserted into the slot 208, and the system 200 may continue operating.

Thus, the robust design of the trays 204 and 206 may facilitate the reliability and the availability of the system 200 beyond the capabilities of traditional server systems that need to run for longer periods of time without interruption. As such, the server trays 204 and/or 206 facilitate fault-tolerant capabilities of the server system 200. In particular, the server trays 204 and/or 206 may include specialized hardware with low failure rates in order to maximize uptime.

For example, the chassis 202 may be connected to a power supply 212 via connections 214 and 216 to provide power to the slots 208 and 210, respectively. The chassis 202 may also be connected to the communication network 218 via connections 220 and 222 to provide network connectivity to the slots 208 and 210, respectively. As such, trays 204 and 206 may be inserted into slots 208 and 210, respectively, and power supply 212 may supply power to trays 204 and 206 via connections 214 and 216, respectively. Further, trays 204 and 206 may be inserted into the slots 210 and 208, respectively, and power supply 212 may supply power to trays 204 and 206 via connections 216 and 214, respectively.

Yet further, trays 204 and 206 may be inserted into slots 208 and 210, respectively, and communication network 218 may provide network connectivity to trays 204 and 206 via connections 220 and 222, respectively. In addition, trays 204 and 206 may be inserted into slots 210 and 208, respectively, and communication network 218 may provide network connectivity to trays 204 and 206 via connections 222 and 220, respectively.

The communication network 218 may, for example, take the form of one or more of the communication networks 108 described above in relation to FIG. 1, possibly including one or both of a data network and a cellular network. In some embodiments, the communication network 218 may provide a network port, a network hub, a network switch, or a network router that may be connected to an Ethernet link, an optical communication link, a telephone link, among other possibilities.

Figure 2B:
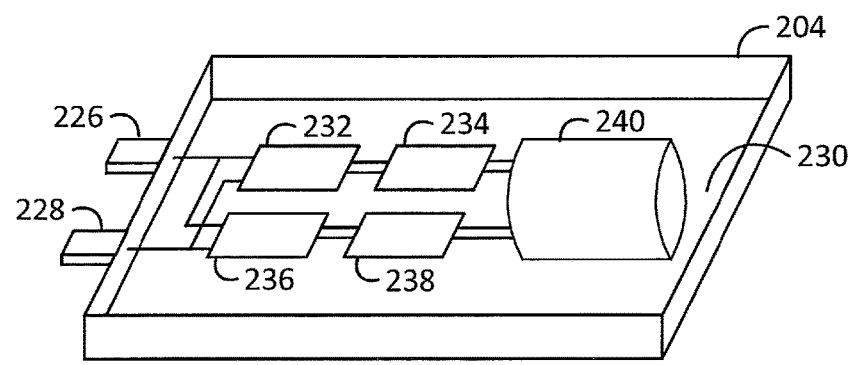
FIG. 2B illustrates an exemplary tray configured to support one or more components, according to an embodiment.

FIG. 2B illustrates an exemplary tray 204 configured to support one or more components, according to an embodiment. The tray 204 may, for example, take the form of tray 204 described in relation to FIG. 2A. Further, the tray 206 may also take the form of the tray 204. As shown, the tray 204 may include a tray base 230 as the bottom surface of the tray 204 configured to support multiple components such as a main computing board connecting one or more components 232-240. The tray 204 may include a connection 226 that may link to the connections 214 or 216 to supply power to the tray 204. The tray 204 may also include a connection 228 that may link to the connections 220 or 222 to provide network connectivity to the tray 204. The connections 226 and 228 may be positioned on the tray 204 such that upon inserting the tray 204 into the slot 208, the connections 226 and 228 couple directly with the connections 214 and 220, respectively. Further, upon inserting the tray 204 into the slot 210, the connections 226 and 228 may couple directly with connections 216 and 222, respectively.

In some embodiments, the tray 204 may include the processor component 232, the memory component 234, the data storage component 236, the communication component and/or interface 238, that may, for example, take the form of the processor 112, the memory 114, the data storage 116, and the communication interface 118, respectively. Further, the tray 204 may include the data engine component 240. As such, the connections 226 and 228 may be configured to provide power and network connectivity, respectively, to each of the components 232-240. In some embodiments, one or more of the components 232-240 may perform operations described herein and/or illustrated by the accompanying figures. In some embodiments, the components 232-240 may execute instructions on a non-transitory, computer-readable medium to cause the system 200 to perform such operations.

As shown, the processor component 232 may take the form of a multi-purpose processor, a microprocessor, a special purpose processor, a digital signal processor (DSP). Yet further, the processor component 232 may take the form of an application specific integrated circuit (ASIC), a programmable system on chip (PSOC), field-programmable gate array (FPGA), and/or other types of processing components. For example, the processor component 232 may take the form of a processor component specifically configured to generate an address based on a request received from one or more of client devices and configure a website accessible with the address. The processor component 232 may also be configured to transmit the address to one or more of the client devices and further, determine a timestamp associated with a transfer of the address from one client device to another client device at a geolocation. The processor 232 may also determine one or more time periods from the timestamp associated with the transfer of the address at the geolocation, where the address may provide access to the data on the website during the one or more time periods.

In some embodiments, the processor component 232 may be configured with a Unix-based operating system, possibly to support scalability with various other servers and/or data infrastructures. In particular, the processor component 232 may be configured to be scalable with other servers of various forms that may, for example, include server trays, blades, and/or cartridges similar to the server trays 204 and/or 206. In some instances, the processor component 232 may be configured with scalable process architectures, including, reduced instruction set architectures. In some instances, the processor component 232 may be backwards compatible with various legacy systems such that the processor component 232 may receive, read, and/or execute instruction sets with legacy formats and/or structures. As such, the processor component 232 generally has capabilities beyond that of general-purpose processors.

The database engine component 240 may include one or more secure databases to track numerous accounts and funds transferred between accounts. For example, the database engine component 240 may include secured databases to identify a sender account and a recipient account such that funds may be transferred from the sender account to the recipient account accordingly. As such, the database engine component 240 may perform searches based on numerous queries, search multiple databases in parallel, and produce search results simultaneously and/or consecutively. Thus, the database engine component 240 may relieve various bottlenecks possibly encountered with the management of number accounts performed by other conventional servers.

Any two or more of the components 232-240 described above may be combined to take the form of one or more ASICs, SOCs, FPGAs, and/or other types of processing components, among other types of processors. For example, two or more of the processor component 232, the memory component 234, the data storage component 236, the communication component and/or interface 238, and/or the data engine component 240 may be combined. Further, the combined component may take the form of one or more processors, DSPs, SOCs, FPGAs, and/or ASICs, among other types of processing devices and/or components described herein. For example, the combined component may take the form an SOC that integrates various other components in a single chip with digital, analog, mixed-signal, and/or radio-frequency functions, all incorporated within the same substrate. As such, the combined component or device may be configured to carry out various operations of the components 232-240.

Components 232-240 described above may provide advantages over conventional or general-purpose servers and/or computers. For example, components 232-240 may enable the system 200 to respond to user requests more efficiently and reliably. In particular, components 232-240 may enable the system 200 to generate websites and addresses to access such websites locally from a single server tray 204. In some instances, configuring a separate and/or dedicated processing component 232 to generate addresses based on requests received from client devices may optimize the generation of websites beyond the capabilities of conventional servers and/or general-purpose processors. As such, the average wait time from the client perspective to generate the websites may be minimized to less than a single second.

It can be appreciated that the system 200, the chassis 202, the trays 204 and 206, the slots 208 and 210, the power supply 212, the communication network 218, and the components 232-240 may be deployed in other ways. The operations performed by components 232-240 may be combined or separated for a given embodiment and may be performed by a greater number or fewer number of components or devices. Further, one or more components or devices may be operated and/or maintained by the same or different entities.

Figure 3A:
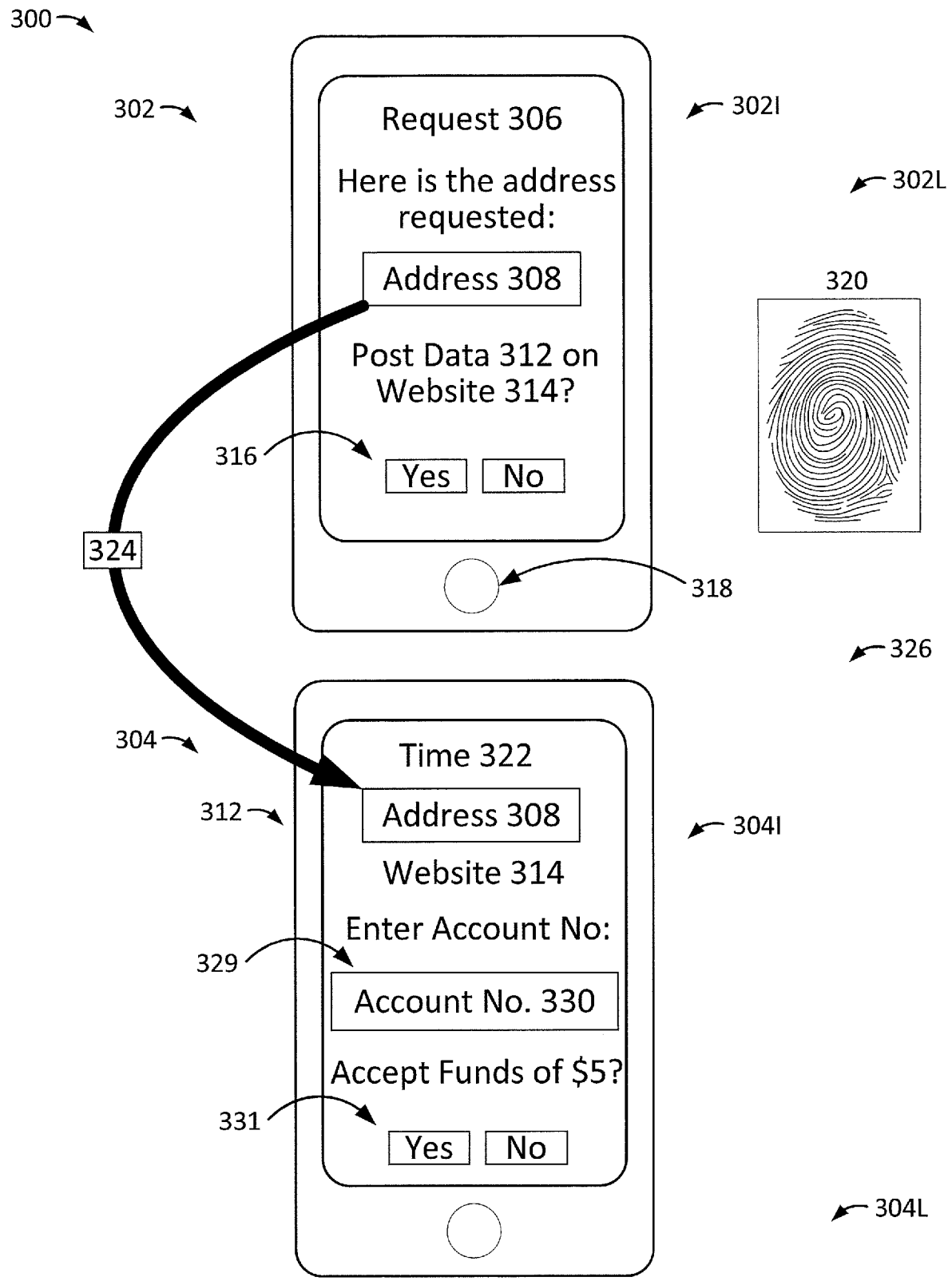
FIG. 3A illustrates an exemplary system with a number of client devices, according to an embodiment.

FIG. 3A illustrates an exemplary system 300 with a number of client devices 302 and 304, according to an embodiment. In some embodiments, the system 300 may take the form of the system 100 such that, for example, the client devices 302 and 304 take the form of the client devices 104 and 106, respectively. Further, the system 300 may take the form of a server system 200 described above in relation to FIGS. 2A-B. Further, the system 300 may include one or more server processor components that may, for example, take the form of the processor components 112 and/or 232. Yet further, the system 300 may include a non-transitory computer-readable medium including instructions that, when executed by the one or more server processor components, cause the server system 300 to perform operations. The operations may include receiving a request 306 from the client device 302 and generating an address 308. For example, the request 306 take the form of a request to create the address 308 to provide access to a website 314 where a fund amount may be transferred to the client device 304 based on the client device 304 having access to the website 314. As shown, for example, a notification provides, "Here is the address requested," and the address 308 appears in the box just below the notification.

In some embodiments, the request 306 may be received from a graphical user interface (GUI) 302I of the client device 302 that may, for example, take the form of the I/O interface 130 described above in relation to FIG. 1. For example, the GUI 302I of the client device 302 may include a touchscreen interface configured to receive a touch input (e.g., touchscreen input data and/or capacitive sensing data) that indicates the request 306 to generate the address 308, possibly such that the user of the client device 302 may transfer funds to another user with the address 308. Considering the one or more scenarios above, the user of the client device 302 may be the traveler that wishes to tip a user of the client device 304, e.g., the driver of the limousine bus.

In some embodiments, the address 308 may include a uniform resource locator (URL) and/or a web address to resources on the website 314 accessible through the Internet. As such, the address 308 may be displayed as a link and/or a hyperlink on the client device 304 that provides access to the website 314 based on a selection (e.g., a pointer clicking or hovering over) the link and/or hyperlink. In particular, the address 308 may be configured to provide access to data 312 on a website 314. For example, the address 308 may be "www.paypal.com/traveler-tip-$5," as described above. Thus, the address 308 may indicate a fund amount in the text of the address 308. The address 308 may be created by a user of the client device 302 and submitted to the server with the request 306. Thus, the request 306 may be approved or denied based on whether the address is already taken or occupied by another website. Further, the server may simply generate an available address and/or a random available address, and thereby transmit the address to the client device 302.

In some embodiments, the address 308 may include a protocol identifier such as "http" that indicates hypertext transfer protocol (HTTP), which may be used to fetch data from the website 314. Notably, HTTP may be one of many different protocols (e.g., file transfer protocol (FTP), Gopher, File, and News) that may be used to access different types of resources on the Internet, possibly accessible over various networks, such as the networks 108 and/or 218 described above. Further, the address 308 may include a resource name or domain name, such as "paypal.com," that may be the complete or partial address to the website 314. In some instances, the format of the resource name may depend on one or more protocols. Thus, the resource name of the address 308 may include, for example, the host name of the server (e.g., the server 102, server tray 204, and/or server tray 206) where the website 314 may be located. In some instances, the resource name of the address 308 may include the pathname or filename (e.g., "traveler-tip-$5") to a file on the server, the port number to which to connect, and/or a reference to a named anchor associated with the website 314.

In some embodiments, the server system 300 may perform various operations such as transmitting the address 308 to the client device 302. As shown, the client device 302 may be configured to display the address 308 on the GUI 302I, as described above. As shown, a question may appear on the GUI 302I of the client device 302 to "Post Data 312 on the Website 314?" or "Is the Address 308 Transferred?" As such, the user of the client device 302 may make a selection 316 (e.g., "Yes" or "No") to post the data 312 on the website 314 and/or indicate the address 308 is transferred. Further, the selection 316 may also indicate a timestamp, e.g., a timestamp 322, and/or a geolocation 326 associated with the transfer 324 of the address 308 from the client device 302 to the client device 304. Thus, the server system 300 may store the timestamp 322 and/or the geolocation 326, possibly retrieved from the client device 302 and/or the client device 304. Yet further, in some instances, the button 318 on the client device 302 may include a fingerprint sensor configured to receive fingerprint data 320, possibly to authenticate the user of the client device 302 and/or the request 306 to generate the address 308 of the website 314. Thus, the client device 302 may communicate with the server (e.g., the server 102, the server tray 204, and/or the server tray 206) to post the data 312 on the website 314 based on the fingerprint data 320 received to authenticate the user, possibly along with other forms of variable authentication data (e.g., a pin number and/or an email address).

In some embodiments, the address 308 may be transferred from the client device 302 to the client device 304. In particular, the user of the client device 304 may simply enter in the address 308 based on viewing the address 308 displayed on the GUI 302I of the client device 302. In some instances, the server may determine a timestamp 322 based on the time when the address 308 is generated. Further, the server may determine a timestamp 322 associated with a transfer 324 of the address 308 at a geolocation 326. In some instances, the timestamp 322 may be retrieved from one or both of the client devices 302 and/or 304. Yet, the server may also record the time based on determining that the client device 304 has received the address 308 from the transfer 324. Various forms of data may be transferred to complete the transfer. For example, radio-frequency identifier (RFID) data, near-field communications data, and/or data transferred over short-wavelength radio waves in the 2.4 to 2.485 GHz range, may include the address 308 to complete the transfer 324. In some embodiments, the server system 300 may perform further operations such as transferring the address 308 to a smart card configured to display the address 308. As such, the transfer 324 of the address 308 may include a physical transfer of the smart card.

In some embodiments, the server system 300 may perform operations that include determining one or more time periods from the timestamp 322 associated with the transfer 324 of the address 308 at the geolocation 326. In some instances, the address 308 may provide access to the data 312 during the one or more time periods determined. As shown, for example, the address 308 may be entered into a browser field open on the client device 304, thereby triggering the website 314 to display on a GUI 304I of the client device 304. A notification may appear to "Enter [the User's] Account No." and the user of the client device 304 may enter the account number 330 in a field 329 displayed on the GUI 304I. Further, a question may be generated that asks, "Accept Funds of $5?" or possibly some other amount. As such, the user of the client device 304 may make a selection 331 (e.g., "Yes" or "No") to possibly accept the funds. Based on selecting "Yes," the funds may be transferred from an account associated with the client device 302 to an account associated with the client device 304, possibly identifiable with the account number 330.

Figure 3B:
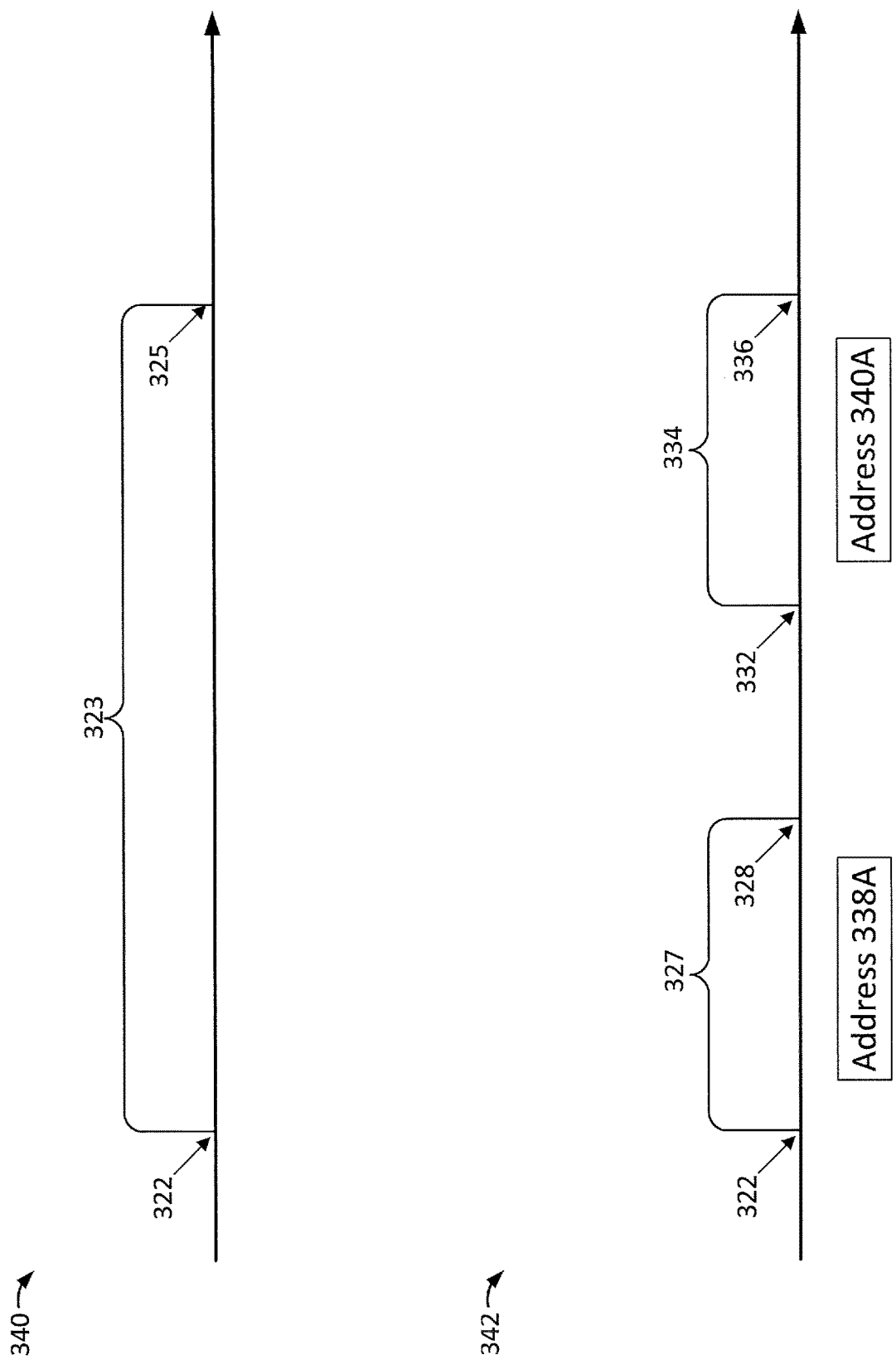
FIG. 3B illustrates one or more time periods, according to an embodiment.

FIG. 3B illustrates one or more timelines 340 and/or 342, according to an embodiment. As noted, the server system 300 may perform operations that include determining the one or more time periods from the timestamp 322 associated with the transfer 324 of the address 308 at the geolocation 326, possibly from the client device 302 to the client device 304. In particular, the data 312 from the website 314 may be taken down after the one or more time periods, or possibly based on the expiration of the one or more time periods.

As shown in timeline 340, for example, the server system 300 may perform operations such as determining the time period 323 from the timestamp 322 to the time 325. For example, the time period 323 may be a forty-eight hour window such that the data 312 may be accessible on the website 314 for the time period 323, such that the user of the client device 304 has a fixed or variable window in time to use the address 308 to access the website 314 and the data 312 to receive the funds. In some instances, the data 312 from the website 314 may be taken down after the time period 323. As such, the user that creates the website 314 may ensure that a certain amount of time is afforded to the recipient of the address 308 to receive the funds. This may also prevent the data 312 remaining available through the website 324 for longer periods of time (e.g., months or years).

As shown in timeline 342, for example, the server system 300 may perform operations such determining the one or more time periods 327 and 334, possibly based on a calendar accessible from a client device, such as the client device 304, and/or possibly a location of the client device 304, for example. In some instances, the data 312 from the website 314 may be taken down during times outside of the time periods 327 and 334. In particular, the time period 327 may begin from the timestamp 322 and end at a time 328, possibly indicating a lunch period identified from the calendar accessible from the client device 304. Further, the time period 334 may begin from the time 332 and end at a time 336, where time 332 may indicate the time when the user of the client device 304 is scheduled to get off work based on the calendar accessible from the client device 304. Yet further, the time period 334 may be a 2-hour window in time to ensure that the user of the client device 304 is afforded with a certain amount of time to receive funds. In various embodiments, the time periods 334 may be varied based on user preferences, possibly preferences indicated with the request 308 to generate the address 308.

In some embodiments, the server system 300 may perform operations that include determining a dynamic time period 327 configured to begin at one or more given times based on at least one of a calendar accessible from the client device 304 and/or the location of the client device 304. For example, the dynamic time period 327 may begin at a time 328 based on a modification to the calendar, possibly where the user of the client device 304 modifies the calendar. For example, the dynamic time period 327 may begin at a time 328 in lieu of the timestamp 322, possibly based on a modification to the user's lunch period that indicates a starting time at the time 328. In some instances, the time period 334 may be a dynamic time period that moves based on the location of the client device 304. For example, the location of the client device 304 may move to the geolocation 326 approximately at the time 336 and the dynamic time period 334 may begin at the time 336 in lieu of the time 332.

In some embodiments, the server system 300 may perform operations that include generating the address 308 to include one or more dynamic addresses 338A and/or 340A. For example, the address 308 configured to provide access to the website 314 may change over time, for example, over various times shown in the timelines 340 and/or 342. For example, the address 308 may provide access to the website 314 over the time period 323. Yet, the address 308 may include one or more dynamic addresses 338A and/or 340A that change based at least on the one or more time periods 327 and/or 334, respectively, determined from the timestamp 332.

In particular, the dynamic address 338A may provide access to the website 314 over the time period 327, while the addresses 308 and 340A are deactivated such that they do not provide access to the website 314. The dynamic address 340A may provide access to the website 314 over the time period 334, while the addresses 308 and 338A are deactivated such that they do not provide access to the website 314. Thus, the data 312 may be accessible to the client device 304 with the dynamic addresses 338A and/or 340A during the one or more time periods 327 and/or 334, respectively. It should be noted that the server system 300 may deactivate any one of the addresses 308, 338A, and/or 340A at any time as described above, where the addresses 308, 338A, and/or 340A may provide access to error messages and/or websites without any data that appear offline and/or taken down.

It should be noted that the server system 300 may include one or more of the processor components 112 and/or 232 to create and/or maintain the time periods 323, 327, and/or 334, possibly utilizing one or more of multi-bit registers. In particular, the one or more processor components 112 and/or 232 may include multiple 16-bit registers that may be used as counters for tracking the time periods 323, 327, and/or 334. Yet further, the counters may also be implemented with loop instruction features such that the time periods 323, 327, and/or 334 may be extended and/or varied.

Figure 3C:
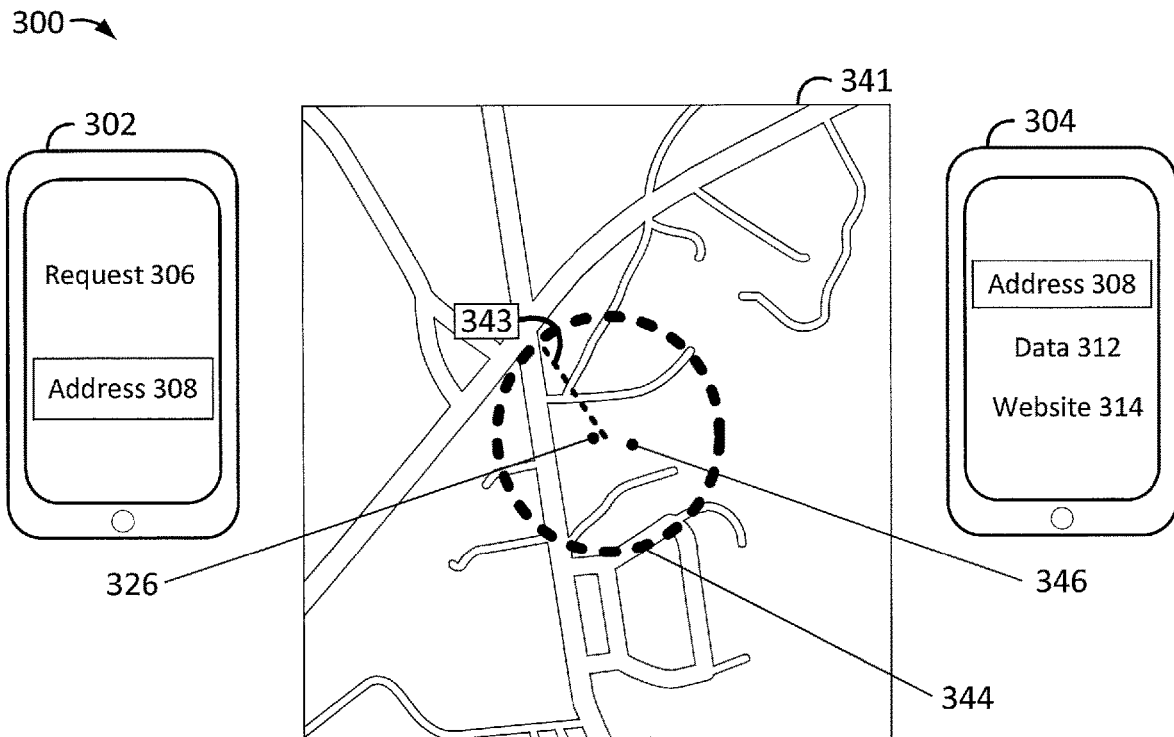
FIGS. 3C, 3D, 3E, and 3F illustrate one or more exemplary systems with a number of client devices, according to an embodiment.

FIGS. 3C, 3D, 3E, and 3F illustrate one or more exemplary systems with a number of client devices, according to an embodiment. As shown in FIG. 3C, for example, the server system 300 may perform operations such as determining a threshold distance 343 from the geolocation 326, shown on the map 341 for illustrative purposes. The threshold distance 343 may be determined based at least on a fund amount electronically accessible through the data 312 on the website 314. For example, the distance 343 may vary depending on the fund amount that is transferred based on accessing the data 312 on the website 314. In particular, the distance 343 may be shorter, for instance, based on a greater fund amount. As such, the probability that the client device 304 receives the fund amount, as opposed to an external device, may be increased and/or varied in other ways. Thus, the distance 343 may be longer, for example, based on a lesser fund amount.

In some embodiments, the fund amount may be accessible to the client device 304 based at least on a location 346 of the client device 304 within the threshold distance 343 from the geolocation 326. As shown, the threshold distance 343 may establish an area 344 where the fund amount may be accessible to the client device 304. As such, the fund amount may not be accessible to the client device 304 based at least on the location 346 of the client device 304 outside of the threshold distance 343 from the geolocation 326.

Figure 3D:
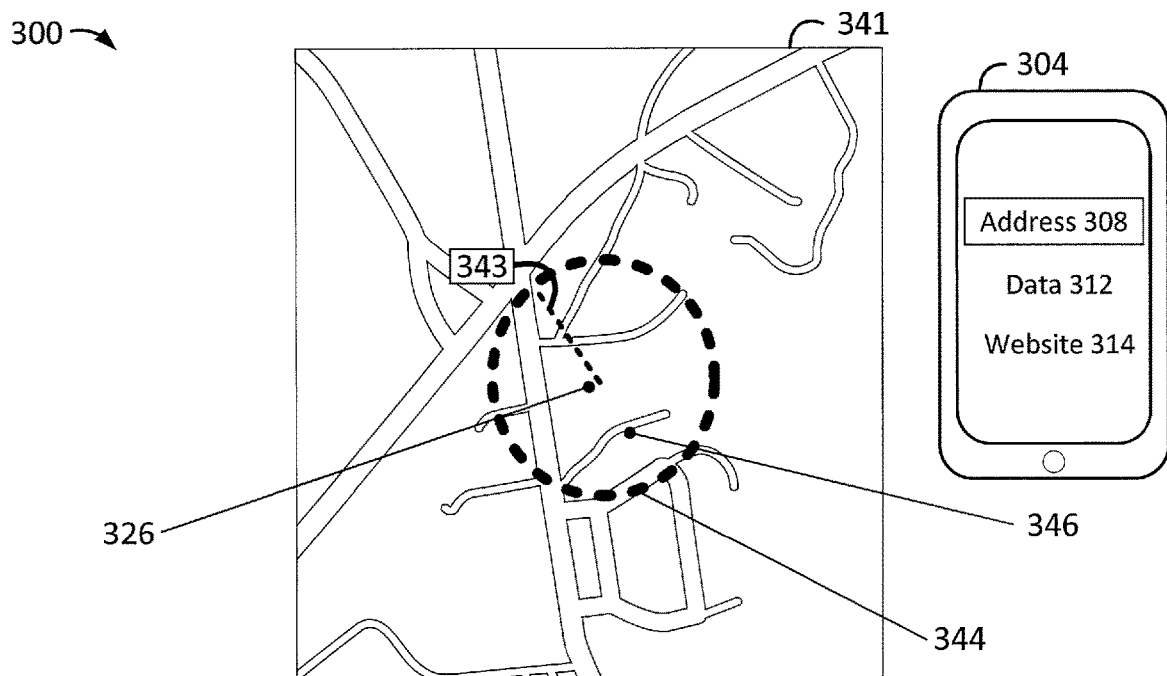

As shown in FIG. 3D, for example, the server system 300 may make the fund amount accessible to the client device 304, shown on the map 341 for illustrative purposes. In particular the fund amount may be accessible to the client device 304, possibly without the client device 302 at the geolocation 326. Yet further, the fund amount may be accessible to the client device 304 without the client device 302 in the area 344. Yet, in some instances, the fund amount may be accessible to the client device 304 only when the client device 302 is in the area 344, possibly based on the fund amount being greater, for example, than a threshold amount.

Figure 3E:
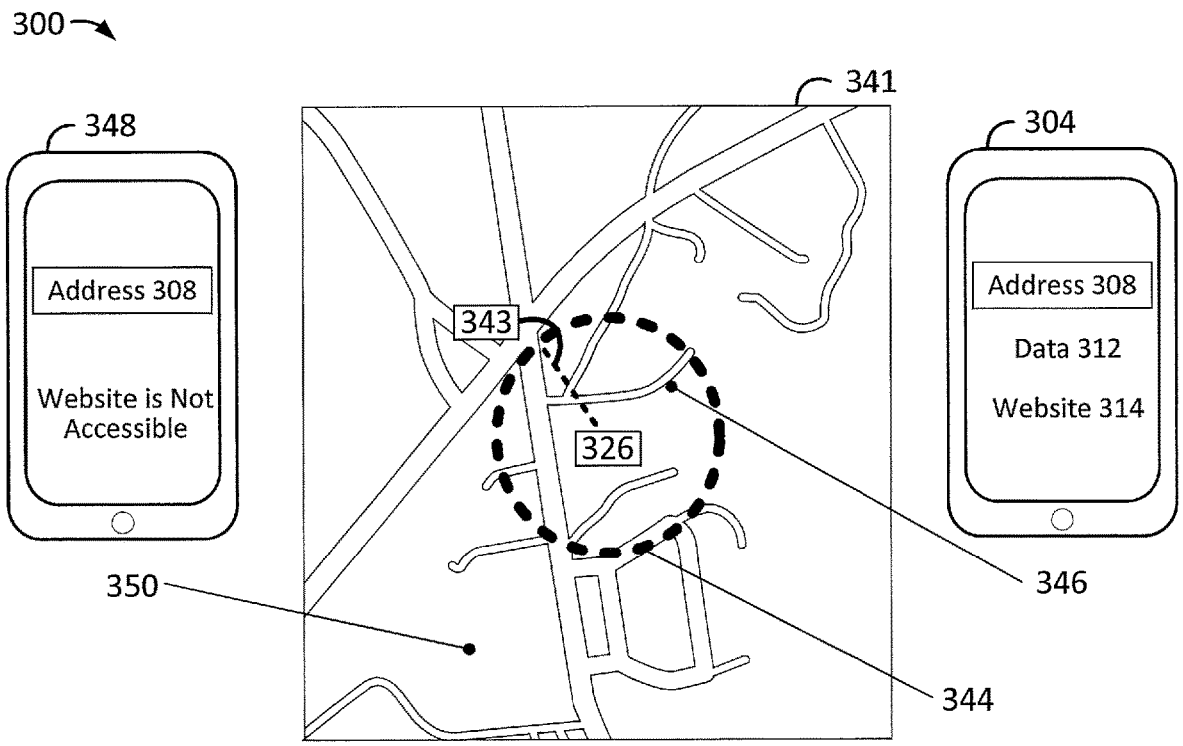

As shown in FIG. 3E, the server system 300 may perform further operations such as determining the address 308 is accessed by an external device 348 at a location 350, shown on the map 341 for illustrative purposes. Further, the operations may include determining the threshold distance 343 from the geolocation 326 based at least on the address 308 accessed by the external device 348. Yet further, the data 312 may not accessible to the external device 348 based at least on the location 350 of the external device 348 outside of the threshold distance 343 from the geolocation 326. As shown, by entering the address 308 in a browser of the external device 348, a notification may indicate that the "Website is Not Accessible." In particular, the server system 300 may decline a connection request made by the client device 348, as described above. Further, the data 312 may be accessible to the client device 304 with the address 308 based at least on the location 346 of the client device 304 within the threshold distance 343 from the geolocation 326.

Figure 3F:
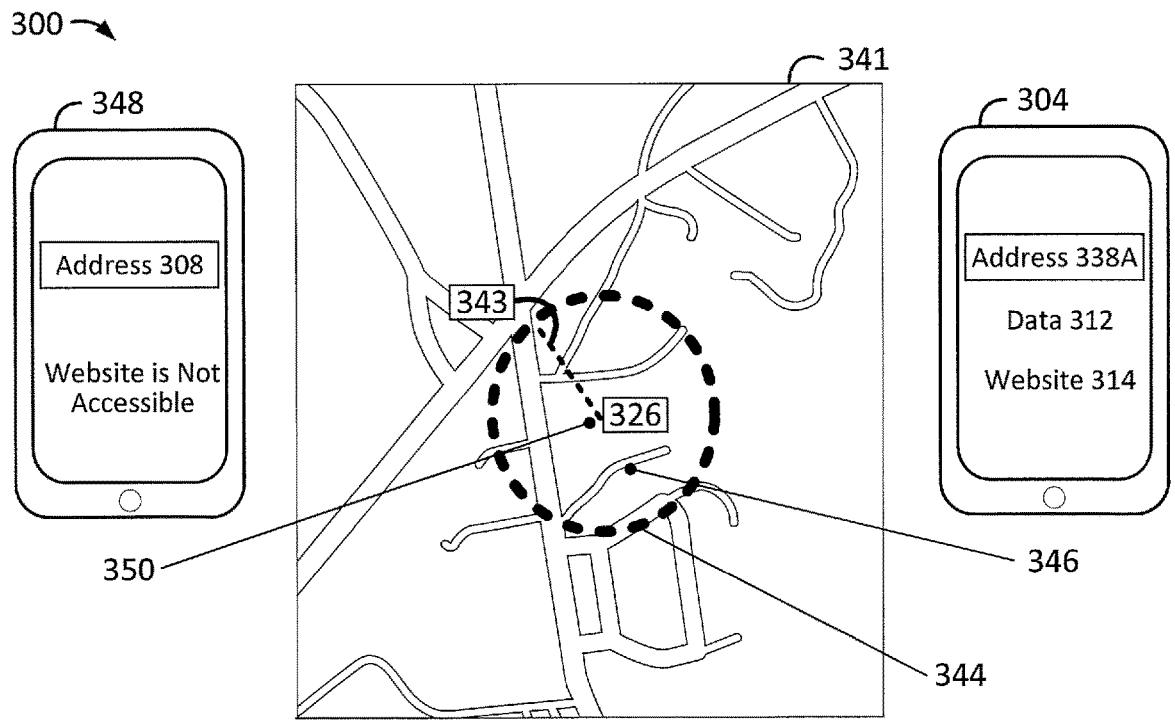

As shown in FIG. 3F, the server system 300 may perform further operations such as determining the address 308 is accessed by the external device 348, shown on the map 341 for illustrative purposes. As shown, the external device 348 is not able to access the data 312 on the website 314. As illustrated, by entering the address 308 in a browser of the external device 348, a notification may indicate that the "Website is Not Accessible." Further, the operations may include determining a dynamic address 338A based at least on the address 308 accessed by the external device 348. In particular, the operations may include transmitting the dynamic address 338A to the client device 304, where the client device 304 is configured to access the data 312 based at least on the dynamic address 338A.

It should be noted that the geolocation 326, the locations 346 and/or 350, the threshold distance 343, and/or the area 344 may be determined from various forms of location data, possibly retrieved by the server system 300 from the client device 302, the client device 304, and/or the external device 348. For example, the location data may be retrieved during the connection process when the client device 302, the client device 304, and/or the external device 348 request a connection with the server system 300. In some instances, the location data may include WiFi beaconing data, Enhanced Observed Time Difference (EOTD) data, global positioning System (GPS) data, Assisted GPS (A-GPS) data, Differential GPS (DGPS) data, Time Difference of Arrival (TDOA) data, Angle of Arrival (AOA) data, triangulation data, local transceiver pilot signal data, among other forms of location data described above. Yet further, in some instances, the location data may include cellular protocol data, including GSM, CDMA, UMTS, EV-DO, WiMAX, or LTE data, and/or base station data. In addition, the location data may also include sensor data, movement data (e.g., acceleration and/or velocity data) of the client device 302 and/or 304, temperature data, radio-frequency identifier (RFID) data, near-field communications (NFC) data, among other possible forms of data.

Figure 3G:
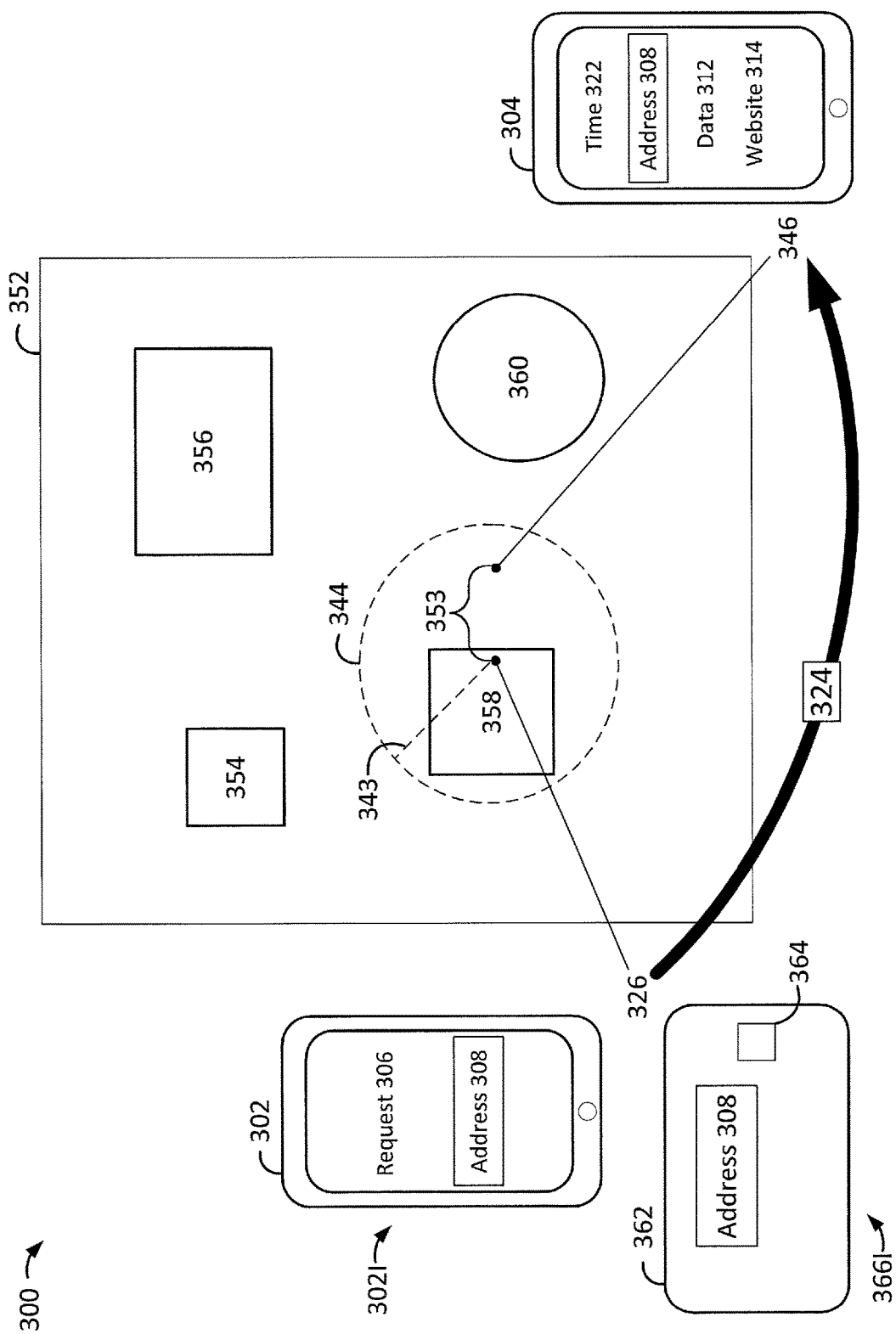
FIG. 3G illustrates an exemplary system with a number of client devices, according to an embodiment.

FIG. 3G illustrates an exemplary system 300 with a number of client devices 302 and 304, according to an embodiment. For example, the client device 302 may take the form of a smart phone system, thereby possibly referred to as a smart phone system 302. In particular, the smart phone system 302 may include one or more memory components configured to store instructions that may take the form of the data storage 136, for example. Further, the smart phone system 302 may include one or more processor components, such as the processor 134, configured to execute the instructions to cause the smart phone system 302 to perform operations. For example, the operations may include receiving the request 306 from a graphical user interface 302I of the smart phone system 302 that may take the form of the I/O interface 130.

In some embodiments, the operations of the smart phone system 302 may also include determining an address 308 based on the request 306 received, where the address 308 provides access to data 312 on the website 314. The operations may also include determining a timestamp 322 associated with a transfer 324 of the address at a geolocation 326, shown on the map 352 for illustrative purposes. As shown, for example, the map 352 may include structures and/or buildings 354, 356, 358, and/or 360. In some instances, the smart phone system 302 may include a number of loop antennae configured to detect a physical distance 353 between the smart phone system 302 and the client device 304. Thus, the address 308 may be transferred to the client device 304 based at least on the physical distance 353 detected between the smart phone system 302 and the client device 304. In some embodiments, the operations of the smart phone system 302 may also include determining one or more time periods 323, 327, and/or 334 from the timestamp 322 associated with the transfer 324 of the address 308 at the geolocation 326, where the address 308 provides access to the data 312 on the website 314 during the one or more time periods 323, 327, and/or 334.

In some embodiments, the data 312 on the website 314 may be accessible to the client device 304 with the address 308 during the one or more time periods 323, 327, and/or 334, where the data 312 on the website 314 is not accessible to the client device 304 with the address 308 during times outside of the one or more time periods 323, 327, and/or 334. Further, the data 312 may include data configured to transfer funds, when accessed by the client device 304, electronically transfers the funds to the account 330 associated with the client device 304. As noted, an indication of a fund amount, the geolocation 358, and/or the building 358 may be identified in the address 308. For example, the address 308 may include "www.paypal.com/sender-tip-$7" and/or "www.paypal.com/$7-sender-to-recipient," among other possibilities.

In some embodiments, the operations of the smart phone system 302 may include transferring the address 308 to a smart card 362 configured to display the address 308. For example, the smart card 362 may include a smart chip 364 configured to receive the address 308 through various protocols such as a radio-frequency identifier (RFID) protocol, a near-field communications protocol, and/or a protocol over short-wavelength radio waves in the 2.4 to 2.485 GHz range. Further, the smart card 362 may include a graphical user interface (GUI) 366I that may also take the form of the I/O interface 130. Further, the transfer 324 of the address 308 at the geolocation 326 may include a transfer of the smart card 362 at the geolocation 326, possibly from the user of the client device 302 to the user of the client device 304.

In some embodiments, the smart phone system 302 may perform further operations such as configuring the smart card 362 to display multiple addresses. For example, the smart card 362 may be configured to display additional addresses, possibly after displaying the address 308. Further, the smart card 362 may display additional addresses generated by the client device 304 and/or the server system 300. For example, the smart card 362 may display a second address requested by the client device 304, where the second address is configured to provide access to second data on a second website.

In practice, for example, the smart card 362 and various other smart cards may be prevalent in areas where data is transferred frequently, such as metropolitan areas, cities or urban areas, and/or airports, for example. In some instances, the smart card 362 may be transferred from a user of the smart phone system 302 to a user of the client device 304. Further, the user of the client device 304 may transfer the smart card 362 to other users as well, where the smart card 362 may be reconfigured by other such users to display subsequent addresses that provide access to data on different websites. As such, the user of the client device 304 may access the different websites to initiate data transfers, possibly to receive additional fund amounts or tips from other users or travelers, for example.

It should be noted that various operations of the smart phone system 302 may be performed with one or more mobile applications, possibly downloadable by the smart phone system 302. For example, a mobile application (possibly referred to as a "mobile app" or "app") may be developed and/or downloaded by the smart phone system 302 based on a set of test and/or live application programming interface (API) data. In some embodiments, one or more APIs may include a payload or a set of input fields associated with a request. In some instances, the API operations may have both required and/or optional input fields. For example, the following fields may include on or more parameters in the payload associated with the request 308 described above.

USER=<Your_APIUsername>&
PWD=<Your_APIPassword>&
METHOD=AddressConfigTransfer&
VERSION=78&
AMT=10&
cancelUrl=http://www.example.com/cancel.html&
returnUrl=http://www.paypal.com/user-tip-$10-1052AM.html As illustrated, the above fields may include parameters (e.g., minimum parameters) that may be included or possibly required in a payload of the request 308. In particular, various parameters may include a username shown above as "USER," a password shown above as "PWD," a method of payment shown above as "METHOD" and "AddressConfigTransfer" (e.g., associated with the address 308 configuration or transfer 324), and an amount for ten dollars shown above as "AMT" and "10."

Figure 4A:
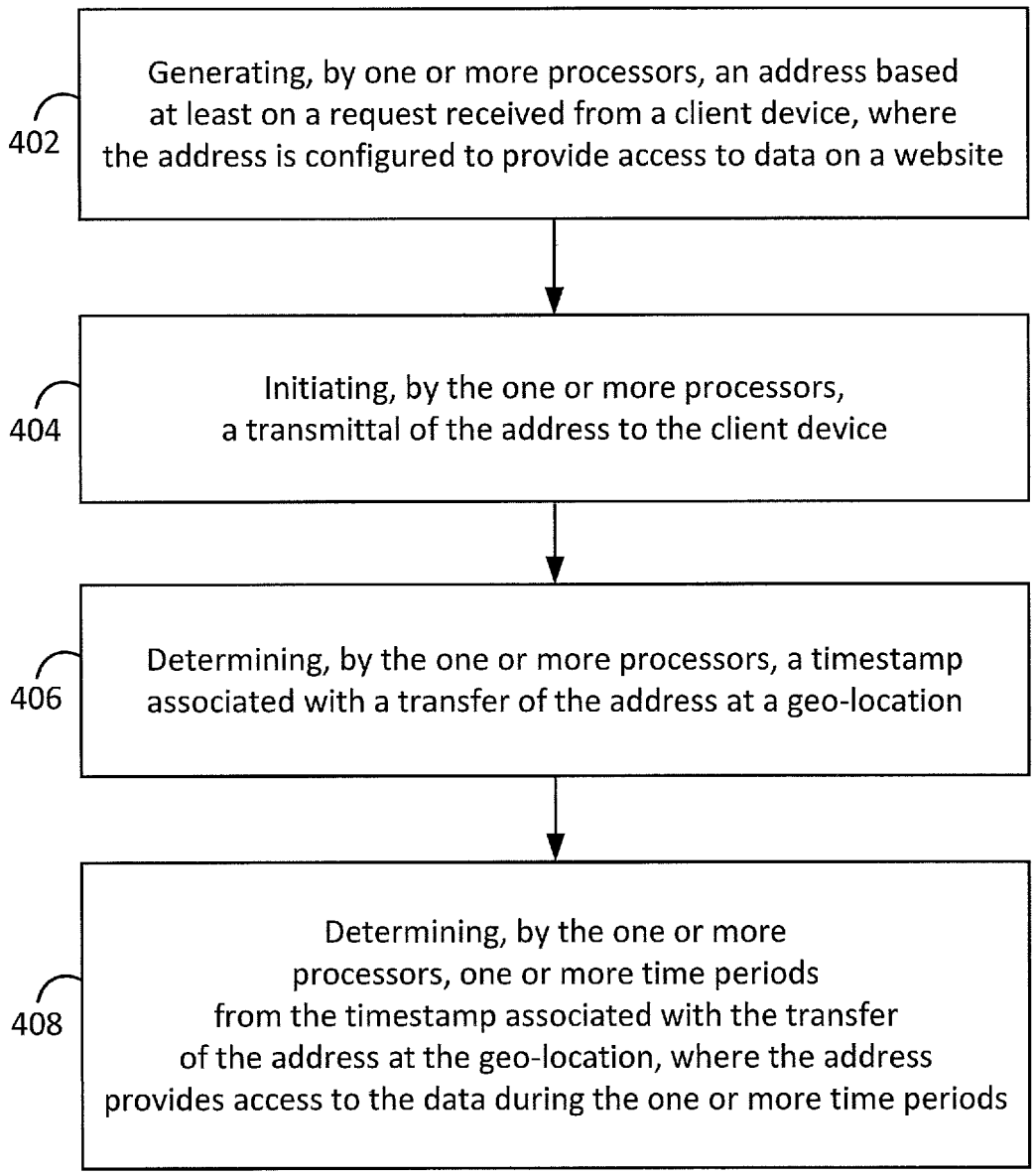
FIGS. 4A and 4B are flowcharts of exemplary methods, according to various embodiments.
Figure 4B:
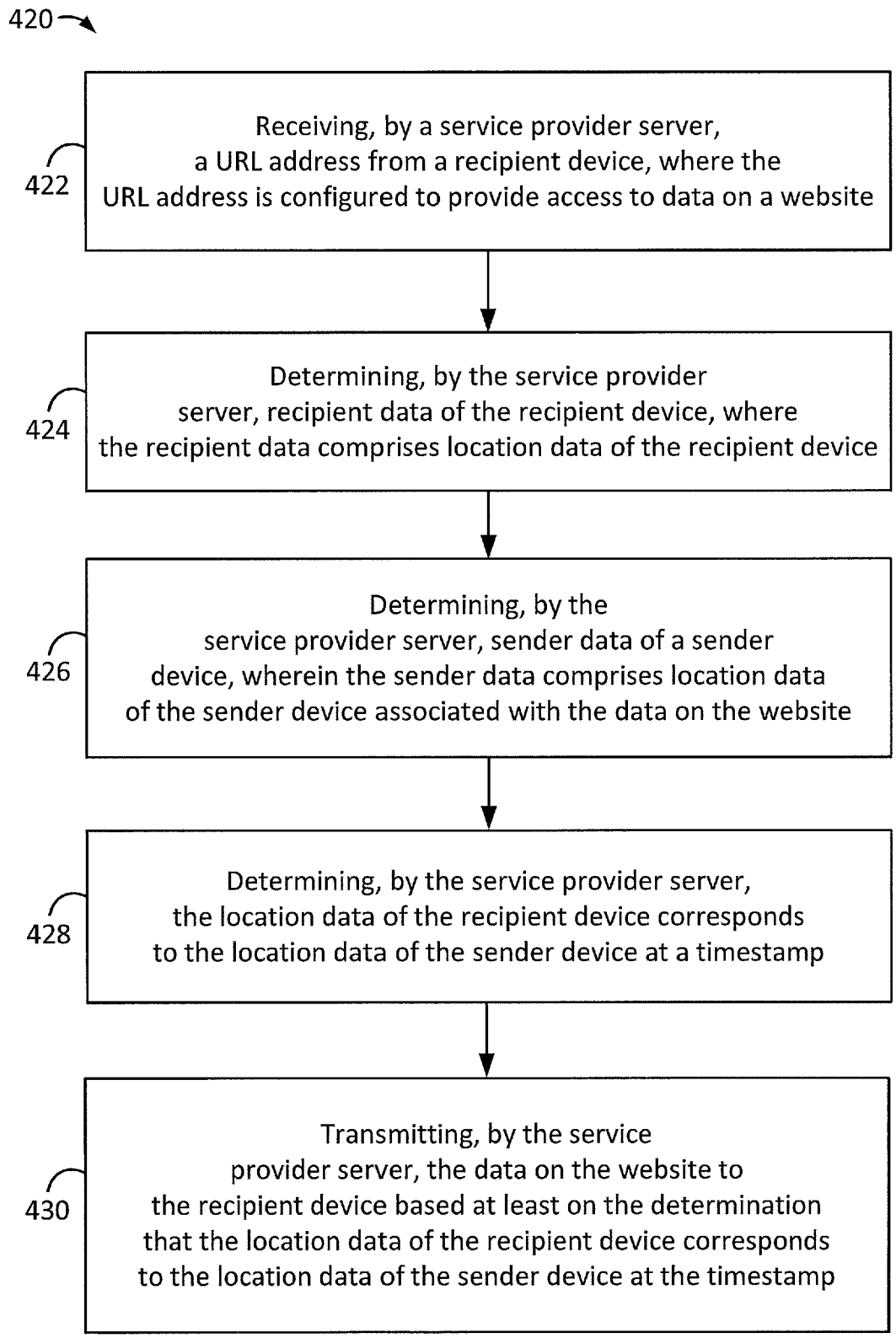

FIGS. 4A and 4B are flowcharts of exemplary methods 400 and 420, respectively, according to various embodiments. Notably, one or more steps of the methods 400, 420, and/or other methods/processes described herein may be omitted, performed in a different sequence, and/or combined with other methods for various types of applications contemplated herein.

As shown in FIG. 4A, at step 402, the method 400 may include generating, by one or more processors, an address based at least on a request received from a client device, where the address is configured to provide access to data on a website. For example, referring back to FIGS. 3A-3G, the method 400 may include generating by one or more processors (e.g., processors 112 and/or 232) of a server system (e.g., systems 100 and/or 200), the address 308 configured to provide access to the data 312 on the website 314.

At step 404, the method 400 may include initiating, by the one or more processors, a transmittal of the address to the client device. For example, the method 400 may include initiating, by the one or more processors (e.g., processors 112 and/or 232), a transmittal of the address 308 to the client device 304.

At step 406, the method 400 may include determining, by the one or more processors, a timestamp associated with a transfer of the address at a geolocation. For example, the method 400 may include determining, by the one or more processors (e.g., processors 112 and/or 232), the timestamp 322 associated with the transfer 324 of the address 308 at the geolocation 326. In some instances, the timestamp 322 may be associated with the generation of the address 308, possibly by one or more servers, such as the server trays 204 and/or 206.

At step 408, the method 400 may include determining, by the one or more processors (e.g., processors 112 and/or 232), one or more time periods from the timestamp associated with the transfer of the address at the geolocation, where the address provides access to the data during the one or more time periods. For example, the method 400 may include determining one or more time periods 323, 327, and/or 334 from the timestamp 322 associated with the transfer 324 of the address 308 at the geolocation 326, where the address 308 provides access to the data 312 during the one or more time periods 323, 327, and/or 334. In some embodiments, determining the one or more time periods 323, 327, and/or 334 from the timestamp 332 associated with the transfer 324 of the address 308 at the geolocation 326 may include determining the one or more time periods 323, 327, and/or 334 based on at least one of a calendar accessible from the client device 304 and/or the location 346 of the client device 304.

In some embodiments, the method 400 may also include determining a threshold distance 343 from the geolocation 326 based at least on a fund amount electronically accessible through the data 312 on the website 314. In some instances, the fund amount is accessible to the client device 304 based at least on the location 346 of the client device 304 within the threshold distance 343 from the geolocation 326 (also referred to herein as the area 344). In some instances, the fund amount is not accessible to the client device 304 based at least on the location 346 of the client device 304 outside of the threshold distance 343 from the geolocation 326. In some instances, as shown in FIG. 3G, the fund amount may be accessible to the client device 304 based on the location 346 of the client device 304 within the area 344 and/or the building 358. In particular, the user of the client device 304 may be required to enter the building 358 to access the data 312 on the website 314 with the address 308.

In some embodiments, the method 400 may include generating the address 308 based at least on the request 306 received from the client device 302. In some instances, the method 400 may include generating the address 308 to include one or more dynamic addresses 338A and/or 340A. Further, the one or more dynamic address 338A and/or 340A may change based on the one or more time periods 323, 327, and/or 334 determined from the timestamp 322. Further, the data 312 may be accessible to the client device 304 with the dynamic addresses 338A and/or 340A during the one or more time periods 327 and/or 334, respectively.

In some embodiments, the method 400 may include determining the address 308 is accessed by the external device 348 at the location 350. Further, the method 400 may include determining a threshold distance 343 from the geolocation 326 based at least on the address 308 accessed by the external device 348. In some embodiments, the data 312 may not be accessible to the external device 348 based on the location 350 of the external device 348 outside of the threshold distance 343 from the geolocation 326. Further, the data 312 may be accessible to the client device 304 with the address 308 based on the location 346 of the client device 304 within the threshold distance 343 from the geolocation 326.

In some embodiments, consider a scenario where a sender gives recipient a URL address on a physical medium, (e.g., card or paper) to give the recipient a payment. In some instances, the sender may give the URL to the recipient electronically. The recipient, at some later time point in time, may enter the URL in to a browser on the recipient device. The URL may direct the recipient to a website or site hosted by a payment provider. The payment provider may determine an amount of money associated with the URL, a location history of the recipient device, and a location history of the sender device. If the sender device and the recipient device are determined to have been in proximity to each other at some time (and any other restrictions are met, such as a time period), funds may be transferred from an account of the sender to an account of the recipient.

As shown in FIG. 4B, at step 422, the method 420 may include receiving, by a service provider server, a URL address from a recipient device, wherein the URL address is configured to provide access to data on a website. For example, the service provider server may take the form of the server 102 and/or server trays 204 and/or 206, described above. In particular, the server 102, possibly referred to as the service provider server 102, may receive a URL address that may take the form of data 124. In some instances, the service provider server 102 may receive the URL address from the data 124 of the client device 106, possibly a recipient device 106. In particular, the recipient device 106 may receive the URL address from the client device 104.

As shown in FIGS. 3A-G, the client device 304 may be referred to as a recipient device 304 that receives a URL address. For example, the recipient device 304 may receive the URL address that perhaps takes the form of the address 308, possibly sent from the client device 302. As such, the client device 302 may be referred to as a sender device 302. In some instance, the service provider server 102 may receive the URL address 308 configured to provide access to the data 312 on the website 314. It should be noted that the sender device 302 may take the form of the client device 104 and the recipient device 304 may take the form of the client device 106.

At step 424, the method 420 may include determining, by the service provider server, recipient data of the recipient device, where the recipient data includes location data of the recipient device. For example, the service provider server 102 may receive and/or retrieve data and/or a data packet 124 from the recipient device 106, possibly from the one or more networks 108. In some instances, the service provider server 102 may retrieve the data 124 referred to as recipient data 124, possibly from the recipient device 106 directly or indirectly. Further, the recipient data 124 may include location data that indicates one or more locations of the recipient device 106.

At step 426, the method 420 may include determining, by the service provider server, sender data of a sender device, where the sender data comprises location data of the sender device associated with the data on the website. For example, referring back to FIG. 1, the service provider server 102 may receive and/or retrieve data and/or data packet 122 from the sender device 104, possibly from the one or more networks 108. In some instances, the server service provider server 102 may retrieve the data 122 referred to as the sender data 122, possibly from the sender device 104 directly or indirectly. Further, the sender data 122 may include location data that indicates one or more locations of the sender device 104.

At step 428, the method 420 may include determining, by the service provider server, the location data of the recipient device corresponds to the location data of the sender device at a timestamp. For example, referring to FIG. 3A, the service provider server 102 may determine the location data 304L of the recipient device 304 corresponds to the location data 302L of the sender device 302 at the timestamp 322. For example, location data 304L and location data 302L may include a multi-dimensional data (e.g., latitude, longitude, and/or altitude) of the geolocation 326.

As shown in FIG. 3C, for example, the service provider server 102 may determine a previous location 346 of the recipient device 304 is proximate to a previous location 326 of the sender device 302 at the timestamp 322. As such, the service provider server 102 may determine that the recipient device 304 was proximate to the sender device 302 at the timestamp 322.

At step 430, the method 420 may include transmitting, by the service provider server, the data on the website to the recipient device based at least on the determination that the location data of the recipient device corresponds to the location data of the sender device at the timestamp. For example, considering one or more of the scenarios above, the service provider server 102 may transmit the data 312 on the website 314 to the recipient device 304 based on determining the location data 304L of the recipient device 304 corresponds to the location data 302L of the sender device 302. In some instances, the service provider server 102 may transmit the data 312 on the website 314 to the recipient device 304 based on determining the previous location 346 of the recipient device 304 is proximate to the previous location 326 of the sender device 302 at the timestamp 322.

In some embodiments, as shown in FIG. 3C, a geolocation may include the previous location 346 of the recipient device 304 and the previous location 326 of the sender device 302. For example, in some instances, the area 344 may be referred to as a geolocation 344. As such, the geolocation 344 may include the previous location 346 of the recipient device 304 and/or the previous location 326 of the sender device 302 at the timestamp 322. As such, the method 420 may further include determining the location data 304L of the recipient device 304 indicates a current location 346 of the recipient device 304 is within the geolocation 344. As such, the data 312 may be transmitted to the recipient device 304 further based on the current location 346 of the recipient device 304 within the geolocation 344.

In some embodiments, the method 420 may include determining one or more time periods 323, 327, and/or 334 from the timestamp 322 to transmit the data 312 on the website 314 to the recipient device 304. Further, the method 400 may include determining a given time the service provider server 102 receives the URL address 308. For example, the service provider server 102 may receive the URL address 308 from the recipient device 304 at a given time within the one or more time periods 323, 327, and/or 334. As such, the data 312 may be transmitted to the recipient device 304 based on the given time being within the one or more time periods 323, 327, and/or 334 from the timestamp 322.

In some embodiments, the one or more time periods 323, 327, and/or 334 may be based on a fund amount electronically accessible through the data 312 on the website 314. For example, one or more of the time periods 323, 327, and/or 334 may be moved and/or modified to be shorter or longer based on the fund amount, among other possibilities. In some embodiments, the method 420 may include determining a calendar from the recipient data 124. As such, the one or more time periods (e.g., time period 323) from the timestamp 322 may include a dynamic time period (e.g., time periods 327, and/or 334) configured to begin at a given time identified in the calendar of the recipient data.

Figure 5:
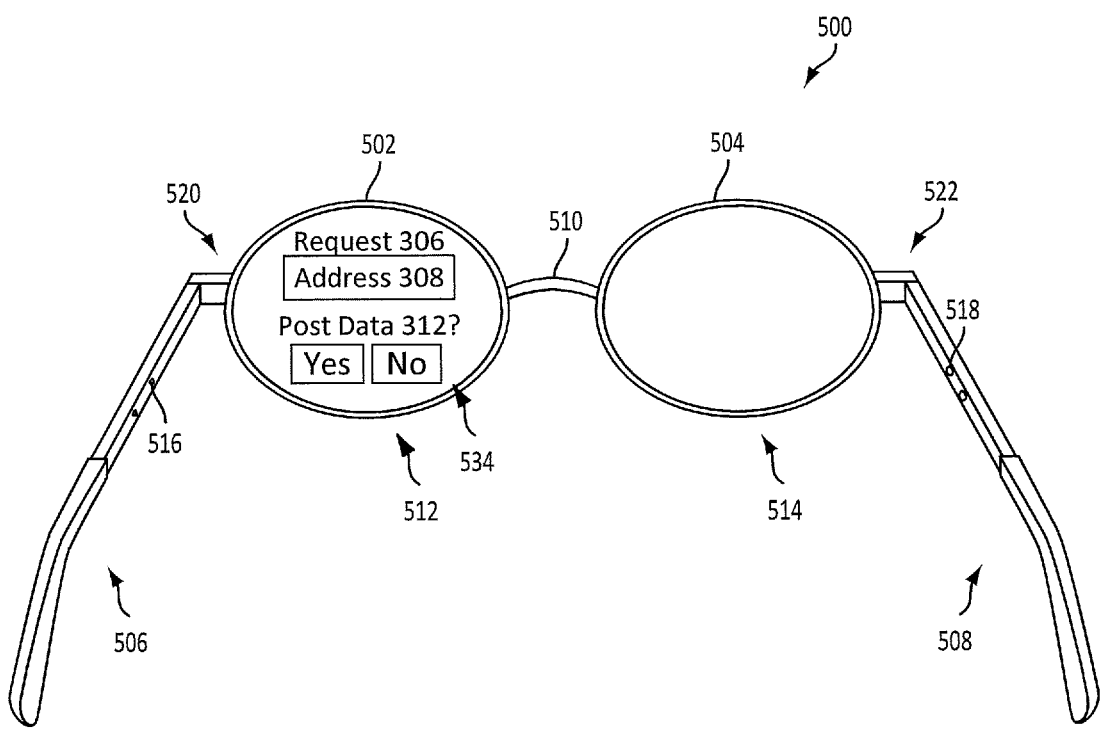
FIG. 5 illustrates an exemplary wearable computing device, according to an embodiment.

FIG. 5 illustrate an exemplary wearable computing device 500, according to an embodiment. As illustrated, the wearable computing device 500 may take the form of a head-mountable display (HMD). As shown in FIG. 5A, the wearable computing device 500 may be wearable as a HMD device. The device 500 may include lenses 502 and 504. The device 500 may also include a side component 506, a side component 508, and a middle component 510. For example, the device 500 may be mountable on a user's head such that the side component 506 rests on one ear of the user and the side component 508 rests on the other ear of the user. Further, the middle component 510 may rest on the nose of the user.

In some instances, the lenses 502 and 504 may be positioned in front of the user's eyes. Further, the lenses 502 and 504 may include displays 512 and 514, respectively. In some instances, the displays 512 and 514 may be transparent, partially see-through, and/or configured to provide an augmented reality. Further, the displays 512 and/or 514 may include touch pad displays. In particular, the touch pad displays may include touch sensor composed of see-through materials, such as indium tin oxide, among other possibilities. As such, the displays 512 and/or 514 may be configured to receive touch inputs and display data such that the user can manipulate graphics provided by the displays 512 and/or 514. The lenses 502 and/or 504 may also include scanners such as laser scanners configured to scan the eyes of the user to retrieve biometric inputs based on the user's eyes, retinas, and/or irises, possibly for authenticating a wearer to be an authorized user.

As shown, the display 512 may generate a notification of the request 306 and the address 308, as described above in relation to FIGS. 3A-3G. In some instances, the notification may include a question, "Post Data 312 on the Website 314?" or "Is the Address 308 Transferred?" As such, the user may make a selection 534 to indicate "Yes" and "No." Thus, by selecting "Yes," possibly through verbal command or a touch selection input to a surface of the display 512, the data 312 may be accessible on the website 314. As such, a client device may access the data 312 on the website 314 with the address 308. Further, by selecting "No," possibly through a verbal command or a touch selection input to the surface of the display 512, the data 312 may not be accessible on the website 314.

The wearable computing device 500 may include one or more sensors 516 and/or 518 configured to receive a number of inputs associated with the user. The one or more sensors 516 and/or 518 may also include accelerometers, gyroscopes, compasses, barometers, capacitive sensors, haptic sensors, temperature sensors, ambient light sensors, sound sensors, image sensors, biometric sensors, moisture sensors, electrodes, and/or chemical sampling sensors, among other types of sensors to receive inputs from the user. For example, based on the way the wearable computing device 500 is worn as a head-mountable device, the sensors 516 and/or 518 may be configured to receive inputs directly and/or indirectly from the user. In some embodiments, the lens 502 may include a sensor that may, for example, include a capacitive sensor and/or proximity sensor to sense, detect, and/or identify the user of the device 500. Further, the sensor may include a biometric sensor such as a fingerprint sensor. Thus, the fingerprint sensor may receive one or more fingerprint inputs from user, possibly to view an account balance.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

The invention claimed is:

1. A system, comprising:
   a non-transitory memory storing instructions; and
   one or more hardware processors coupled to the non-transitory memory and configured to read the instructions from the non-transitory memory to cause the system to perform operations comprising:
   receiving, from a first electronic device, a first request to provide a first electronic link for transferring funds;
   generating, in response to the receiving of the first request, the first electronic link;
   receiving, from a second electronic device, a second request to access the first electronic link;
   generating, in response to the receiving of the second request, an alert to the first electronic device requesting a biometric input from a user of the first electronic device;
   receiving, the biometric input form the first electronic device and determining that a match exist between the biometric input received and a prior biometric stored that is associated with the user of the first electronic device; and
   processing, based on the determining, the second request.

2. The system of claim 1, wherein the operations further comprise:
   determining, in response to the determining a distance between the first electronic device and the second electronic device, whether the first electronic device and the second electronic device were within a threshold distance.

3. The system of claim 2, wherein the determining further includes determining that the threshold distance occurred during a predefined period of time.

4. The system of claim 3, wherein the access is denied when the determining the threshold distance occurs after the predefined period of time.

5. The system of claim 1, wherein the first electronic link includes a web address with a partial description of a transaction associated with a transfer of funds.

6. The system of claim 1, wherein the processing includes providing access to the second electronic device and transferring the funds associated with the link for transferring funds.

7. The system of claim 2, wherein the operations further comprise:
   declining, second request to access, in response to determining that the distance between the first electronic device and the second electronic device is greater than the threshold distance.

8. A method comprising:
   receiving, from a first electronic device, a first request to provide a first electronic link for transferring funds;
   generating, in response to the receiving of the first request, the first electronic link;
   receiving, from a second electronic device, a second request to access the first electronic link;
   generating, in response to the receiving of the second request, an alert to the first electronic device requesting a biometric input from a user of the first electronic device;
   receiving, the biometric input form the first electronic device and determining that a match exist between the biometric input received and a prior biometric stored that is associated with the user of the first electronic device; and
   processing, based on the determining, the second request.

9. The method of claim 8, further comprising:
   determining, in response to the determining a distance between the first electronic device and the second electronic device, whether the first electronic device and the second electronic device were within a threshold distance.

10. The method of claim 9, wherein the determining further includes determining that the threshold distance occurred during a predefined period of time.

11. The method of claim 10, wherein the access is denied when the determining the threshold distance occurs after the predefined period of time.

12. The method of claim 8, wherein the first electronic link includes a web address with a partial description of a transaction associated with a transfer of funds.

13. The method of claim 8, wherein the processing includes providing access to the second electronic device and transferring the funds associated with the link for transferring funds.

14. The method of claim 9, further comprising:
   declining, second request to access, in response to determining that the distance between the first electronic device and the second electronic device is greater than the threshold distance.

15. A non-transitory machine-readable medium having stored thereon machine-readable instructions executable to cause a machine to perform operations comprising:
   receiving, from a first electronic device, a first request to provide a first electronic link for transferring funds;
   generating, in response to the receiving of the first request, the first electronic link;

receiving, from a second electronic device, a second request to access the first electronic link;

generating, in response to the receiving of the second request, an alert to the first electronic device requesting a biometric input from a user of the first electronic device;

receiving, the biometric input form the first electronic device and determining that a match exist between the biometric input received and a prior biometric stored that is associated with the user of the first electronic device; and processing, based on the determining, the second request.

16. The non-transitory machine-readable medium of claim 15, further comprising:

determining, in response to the determining a distance between the first electronic device and the second electronic device, whether the first electronic device and the second electronic device were within a threshold distance.

17. The non-transitory machine-readable medium of claim 16, wherein the determining further includes determining that the threshold distance occurred during a predefined period of time.

18. The non-transitory machine-readable medium of claim 17, wherein the access is denied when the determining the threshold distance occurs after the predefined period of time.

19. The non-transitory machine-readable medium of claim 15, wherein the first electronic link includes a web address with a partial description of a transaction associated with a transfer of funds.

20. The non-transitory machine-readable medium of claim 15, wherein the processing includes providing access to the second electronic device and transferring the funds associated with the link for transferring funds.

* * * * *